United States Patent [19]

Cunningham

[11] Patent Number: 4,765,443

[45] Date of Patent: Aug. 23, 1988

[54] CALIPER BRAKE FOR MOUNTAIN BICYCLES HAVING WIDE TIRES

[76] Inventor: Charles B. Cunningham, 121 Wood La., Fairfax, Calif. 94930

[21] Appl. No.: 32,956

[22] Filed: Mar. 31, 1987

Related U.S. Application Data

[63] Continuation of Ser. No. 740,648, Jun. 3, 1985, abandoned, which is a continuation-in-part of Ser. No. 534,380, Sep. 21, 1983, abandoned.

[51] Int. Cl.$^4$ ............................................. B62L 3/00
[52] U.S. Cl. .................... 188/24.21; 188/24.19; 188/24.22; 188/24.12
[58] Field of Search ............. 188/24.11, 24.12, 24.13, 188/24.14, 24.15, 24.16, 24.18, 24.19, 24.21, 24.22

[56] References Cited

U.S. PATENT DOCUMENTS

| | | | |
|---|---|---|---|
| 2,160,181 | 5/1939 | Taylor | 188/24.21 |
| 2,460,204 | 1/1949 | Vacher | 188/24.21 |
| 3,314,504 | 4/1967 | Altenburger | 188/24.19 |
| 4,051,924 | 10/1977 | Yoshigai | 188/24.12 |
| 4,301,894 | 11/1981 | Arai | 188/24.19 |
| 4,546,858 | 10/1985 | Nagano | 188/24.19 |

FOREIGN PATENT DOCUMENTS

| | | | |
|---|---|---|---|
| 0023414 | 2/1981 | European Pat. Off. | 188/24.12 |
| 0815461 | 10/1951 | Fed. Rep. of Germany | 188/24.21 |
| 0863006 | 1/1953 | Fed. Rep. of Germany | 188/24.12 |
| 0524762 | 9/1921 | France | 188/24.12 |
| 0600907 | 2/1926 | France | 188/24.21 |
| 0633234 | 1/1928 | France | 188/24.21 |
| 0907035 | 2/1946 | France | 188/24.12 |
| 1000765 | 2/1952 | France | 188/24.21 |
| 1000840 | 2/1952 | France | 188/24.22 |
| 0973248 | 9/1952 | France | 188/24.21 |
| 1075997 | 10/1954 | France | 188/24.21 |
| 0972185 | 11/1954 | France | 188/24.12 |
| 0556268 | 6/1958 | Italy | 188/24.12 |
| 0029576 | 11/1907 | United Kingdom | 188/24.18 |
| 0179277 | 4/1922 | United Kingdom | 188/24.21 |
| 0247337 | 2/1926 | United Kingdom | 188/24.21 |
| 0274755 | 7/1927 | United Kingdom | 188/24.21 |
| 0648040 | 12/1950 | United Kingdom | 188/24.12 |
| 0676463 | 7/1952 | United Kingdom | 188/24.21 |
| 0911876 | 11/1962 | United Kingdom | 188/24.12 |

Primary Examiner—John W. Caldwell, Sr.
Assistant Examiner—Alvin Oberley
Attorney, Agent, or Firm—Owen, Wickersham & Erickson

[57] ABSTRACT

A caliper brake for wide-tire mountain bicycles. Each caliper arm is pivotally mounted to a stationary pivot post of the bicycle frame via a cylindrical bushing to which the arm is press fitted. A return spring is retained around the pivot post in a normally stationary portion enabling purposeful adjustment. A brake shoe holder is mounted on one end of the caliper arm, and a roller-mounting post is secured to the other end. A cam roller is mounted rotatably on the roller mounting post by a low-friction bearing and has a circumferential groove engaging a cammed edge of a cam plate, to which a brake-actuating cable is secured. The brake shoe holder is preferably asymmetrical and is mounted for adjustment lengthwise of the caliper arm and for rotation around it and is also made adjustable as to the spacing from the caliper arm and as to the rotational position around an axis perpendicular to that arm.

44 Claims, 5 Drawing Sheets

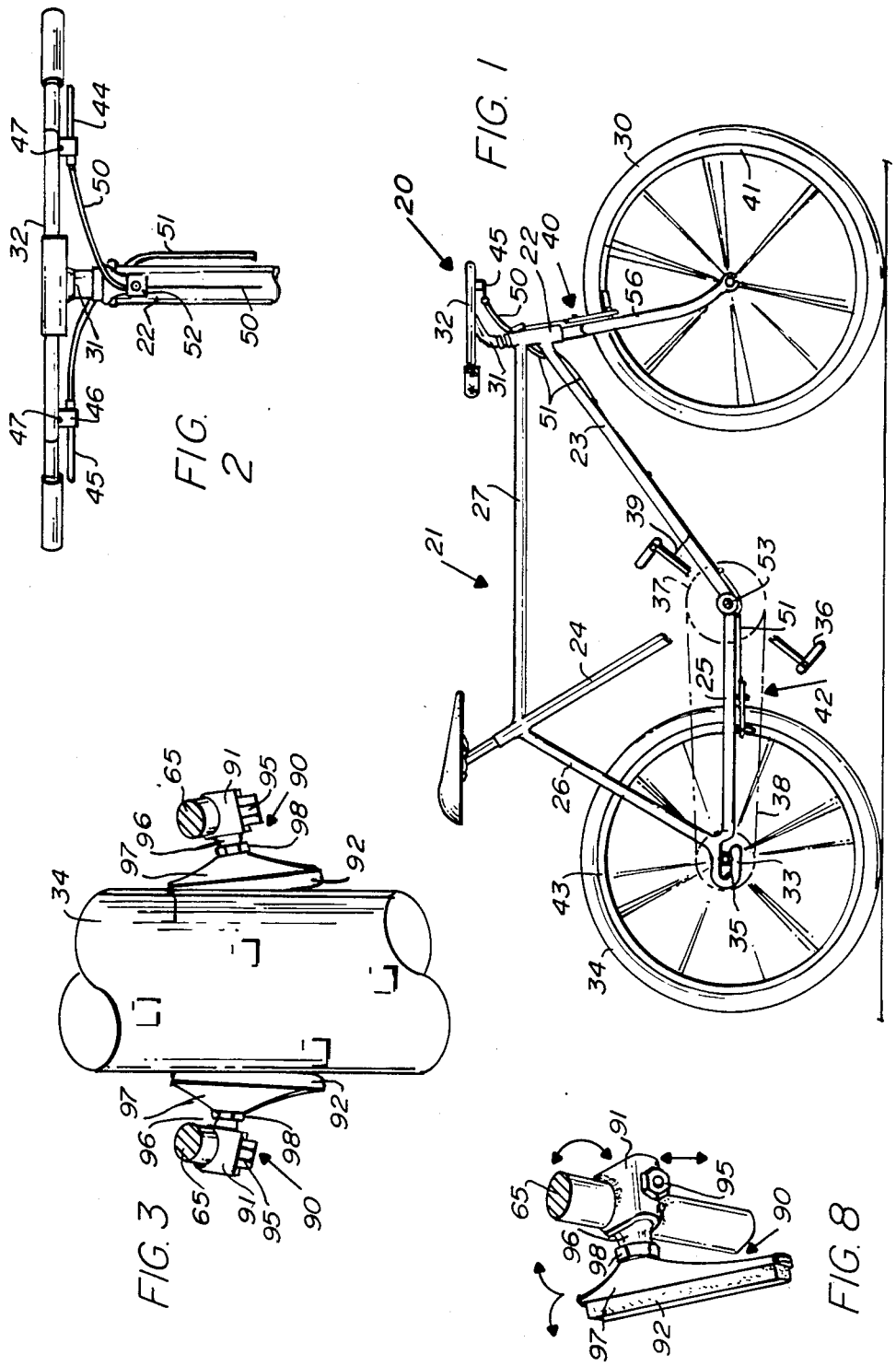

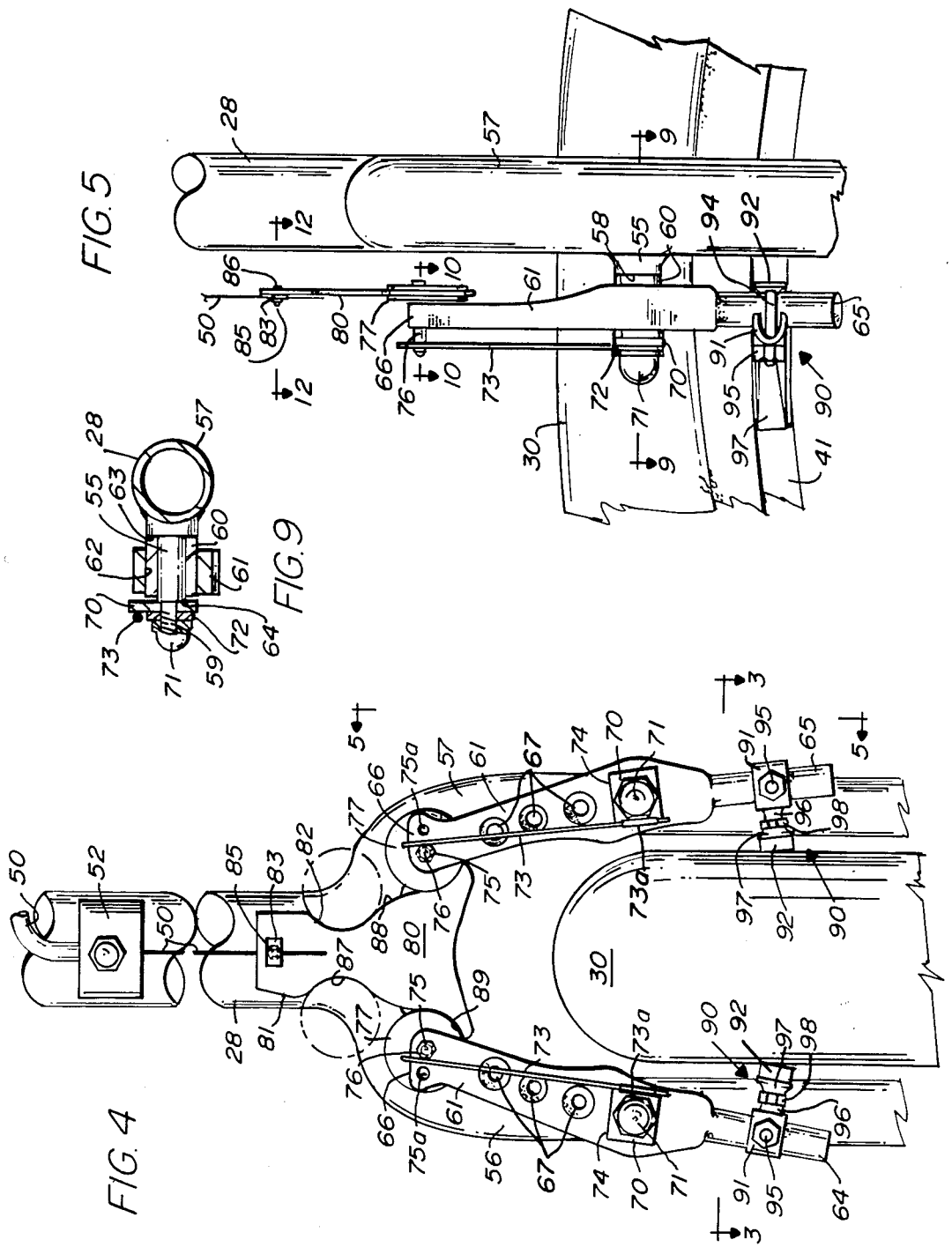

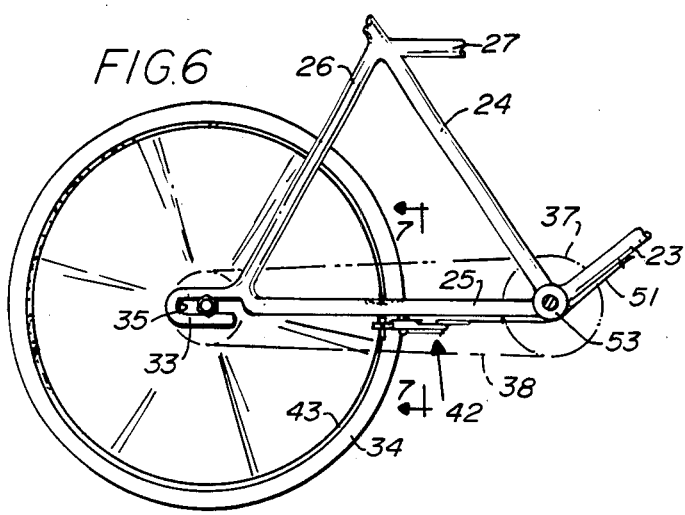
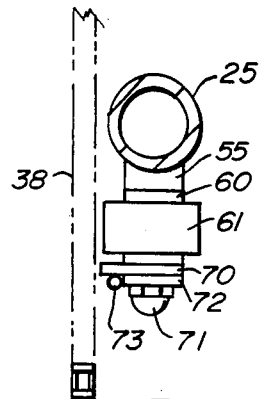
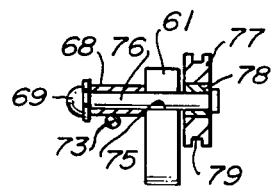
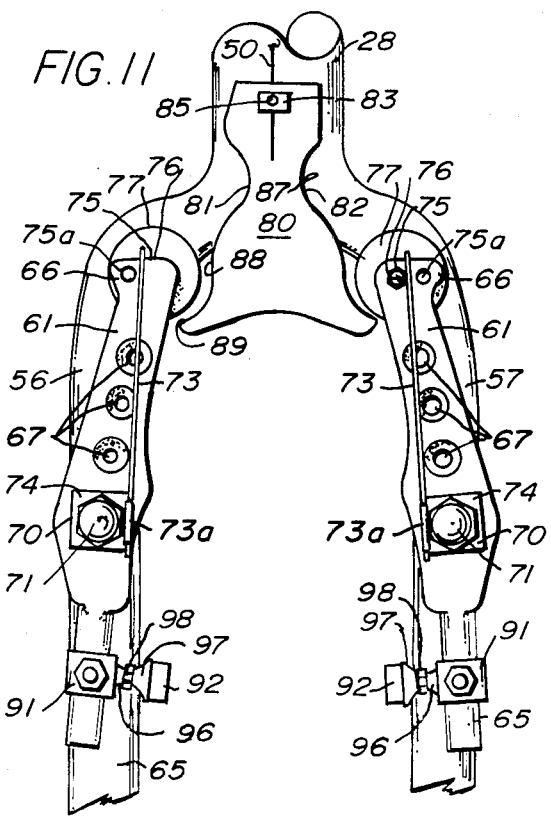
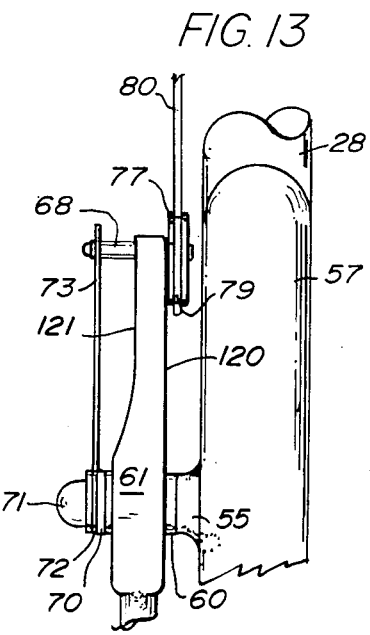

FIG. 12
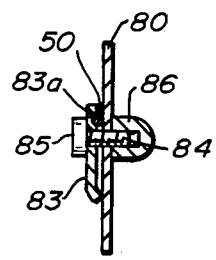
FIG. 14
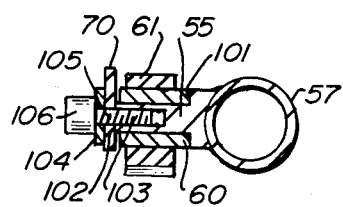
FIG. 15
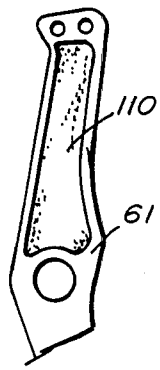
FIG. 16
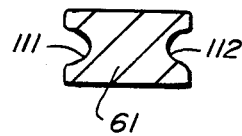
FIG. 18
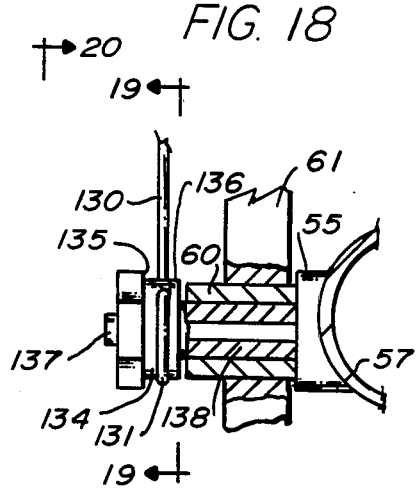
FIG. 17
FIG. 24
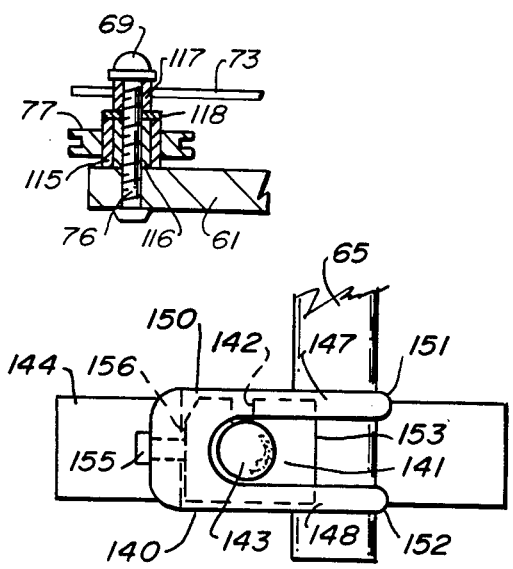

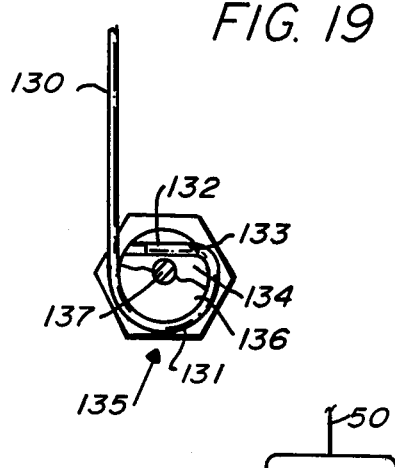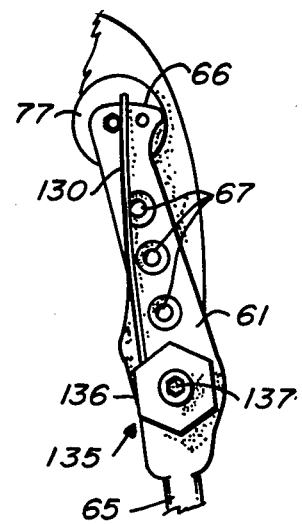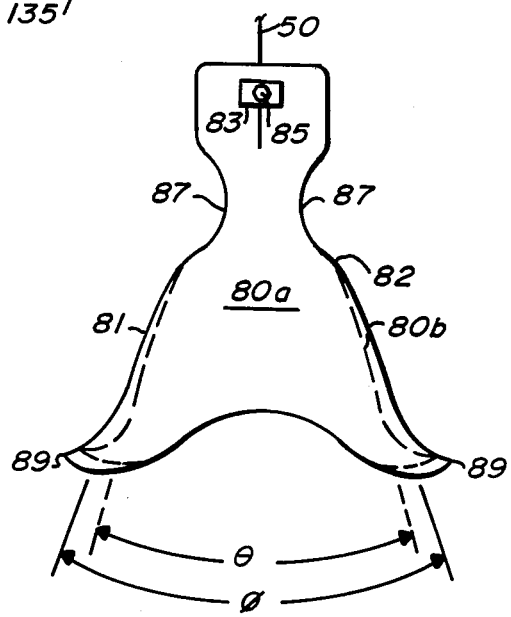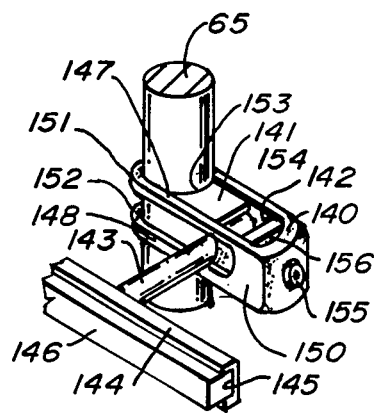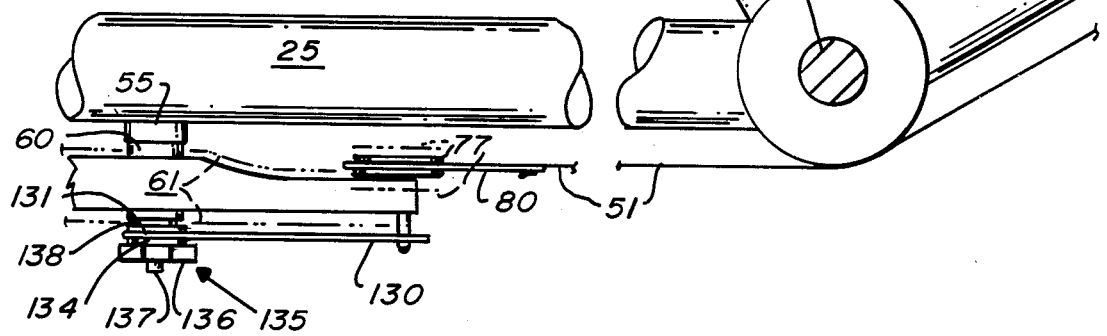

CALIPER BRAKE FOR MOUNTAIN BICYCLES HAVING WIDE TIRES

REFERENCE TO RELATED APPLICATION

This is a continuation of application Ser. No. 740,648, filed June 3, 1985 and now abandoned, which is a continuation-in-part of application Ser. No. 534,380, filed Sept. 21, 1983, abandoned.

BACKGROUND OF THE INVENTION

This invention relates to an improved caliper brake for use on bicycles and particularly for bicycles having wide tires, often referred to as mountain bicycles or off-the-road bicycles.

Mountain bicycles are capable of negotiating any terrain worthy of a road or footpath. They have "fat" or wide cross-section tires mounted on narrow rims; they also employ such features as wide-ratio derailleur gears, thumb shifters, BMX pedals, and heavy duty brakes, front and rear. Usually the handlebars are flat and the seat high and quickly adjustable.

These bicycles, being used off the road, necessarily encounter very adverse conditions that ordinary bicycles and even touring and racing bicycles would be unable to meet and survive. Rocks are hit; long expanses of mud are often encountered. Sharp turns, hills, valleys, narrow passageways, holes, ruts, dust, and mud are normal. The brake system is one of the major keys to success or failure.

It is noteworthy that in the very muddy 1983 NORBA National Championship Race almost all of the brakes—except the ones built according to the present invention—were either worn down or broken off by the end of the race, whereas those of the present invention were all still operative.

Many types of brakes that have been used successfully on narrow-tire bicycles, have proven unsatisfactory for use on wide-tire bicycles. Thus, although both drum and disk brakes provide some excellent characteristics, such as being resistant to wet conditions, they are too heavy, and the disk brakes are also quite expensive. They are complex and too easily damaged under severe off-the-road conditions. Moreover, since they transmit the braking torque through the spokes, they tend to loosen the spokes.

Cantilever brakes have heretofore been preferred for high quality bicycles of the wide-cross-section or balloon-tire type. Cantilever brakes are light, give good braking, and are inexpensive, but they have the disadvantage that they project out from the sides of the bicycle and as a result tend to catch on bushes or other obstructions and, consequently, be damaged and, in some cases, have resulted in injuries to the rider. Also, these brakes were originally designed for on-the-road or touring bicycles with narrow tires; therefore, although they generate enough pad pressure for good stopping at low to moderate speeds, even on bikes having wide tires, they are not powerful enough to take full advantage of the traction which wide-tire bicycles have, and at high speeds they tend to produce a fading and mushy effect. Similar problems are also traceable to the great traction of the wide tires and to the fact that they store much greater energy at high speeds.

The conventional sport bicycles with narrow tires have long used caliper brakes. However, when these conventional caliper brakes have been used on bicycles having the wide tires characteristic of mountain bicycles, both the center-pull and side-pull caliper brakes have tended to give an extremely mushy reaction, due to the lengthening of the brake arms in order to clear the wide-diameter tires, this lengthening resulting in excessive flexing. For that reason, caliper brakes have been looked down on by cyclists using off-the-road bicycles.

A problem found even when the better caliper type brakes are used on narrow-diameter tires, has been that they have not afforded independent adjustment of the return spring force on each side of the tire rim. Usually these caliper brakes have had only a single spring, which, of course, could not give the desired independent adjustment. However, even when the brake did employ two springs, those springs were not independently adjustable. As a result, it has been difficult to achieve the proper tension on the actuating cable, a tension which determines the return tension of the hand control lever. Yet, such adjustments are usually necessary because of the widely varying mechanical advantages among the different control levers being used, especially when they are applied to bicycles having wide-diameter tires.

For example, Magura motorcycle control levers have been used on many wide-tire bicycles in conjunction with upright motorcycle-type handlebars. The optimum cable-return tension necessary to return a Magura type of lever properly to its unactuated position is appreciably different from the tension necessary to return one of the levers likely to be used with the increasingly-popular drop bar used on wide-tire bicycles. These have distinctly different designs and have leverage ratios much different from those of the motorcycle-type levers. Since some riders prefer one type of lever and some prefer another, there will almost always have to be adjustments of the brake to the particular kind of lever being used.

There is also a problem with pad centering when the bicycle is used under the unusually adverse environmental conditions to which the mountain bicycles are subjected. Some prior-art bicycles have relied on a mounting bolt passing through the mounting plate. Others have used a combination of adjustable pad locations with the positioning effect of an actuating cable passing through a cable stop, as means for centering the pads; these are often called floating return spring systems. Such systems have been found to be unacceptable for use on wide-tire bicycles, because the centering is not positive enough to overcome the friction resulting from uneven mud buildups on the various parts of the brake. Since these bicycles are often used off the road, mud buildup is a common, and can be a very difficult problem, especially with this type of brake. Thus, although the pads may be perfectly centered before the ride begins, they become uncentered once heavy mud is encountered, and then one pad tends to rub on the rim while the other pad is distant from it.

The use of a mounting bolt passing through the mounting plate is more positive than the "floating return spring" systems, but even then the pad-centering systems requires a supporting member that is, in its own turn, mounted to the bicycle by one or more bolts. This increases the complexity, adds weight, and, if attempts are made to make it light, the resulting structure detracts substantially and effectively from the needed rigidity. Overall stiffness and rigidity of the brake system is necessary for this kind of bicycle because of the larger braking forces required, since there is much more tire traction from the wide-diameter tires. Also, the very fact that the tire profile is large means that the brake arms and mounting members must be longer if they are to clear the tire. If, when they are made longer, they are not rigid enough, they tend to squeal, due to high-frequency flex, and also tend to feel mushy to the rider. If they are made rigid, they add considerably to the weight.

Other problems relate to the cable clamp used to connect the cable to the brake. Some of the brakes pass the cable through a hollow bolt, and in this structure there is a tendency for the cable to become frayed or crimped so that service becomes difficult. In others, the cable is pulled through a slot in a curved plate, and this expedient appears also to result in fraying. Some brakes require an integral ferrule on the end of the cable; this is an undesirable approach because the brake-actuating levers used with these bicycles also have an integral ferrule, so that the cable core is trapped in the housing and cannot be removed for lubrication. Nor can the length be adjusted to accommodate the many different kinds of bicycles being used.

An additional problem is that of obtaining adjustment of the brake shoe—radially for radial alignment with the tire rim, rotationally along the axis of the brake caliper, and rotationally along the axis perpendicular to the caliper and to the plane of the tire. Also, inward adjustment toward the rim may be needed as the brake pad wears.

A further problem results from the fact that many bicyclists desire a quick-release system, enabling quick removing of a wheel and its tire from the bicycles. Quick removal saves a great deal of time, when tire repair must be made during as race, for example. Some brakes have them, but some do not, though it is considered by many users to be essential for wide-tire bicycles. Removal of narrow tires is not impeded by the brakes, for they are little wider than the rim. Heretofore, quick-release mechanisms have required additional apparatus, resulting in complexity or additional weight and adding to the number of things that can go wrong.

Thus, although many prior-art types of brakes are suitable for on-the-road bicycles, they are far from satisfactory for the stringent conditions under which mountain or off-the-road bicycles must operate and for use with the wide, large cross-section tires mounted on the narrow rims of such bicycles. Mountain bicycle brakes must meet all of the following requirements, and the prior-art brakes meet few, if any, of them:

(1) The brake must provide a powerful braking force and do this with high mechanical advantage in the brake structure, for the wide tires provide much more traction than do narrow tires, and braking force adequate for narrow tires is usually inadequate for wide tires.

(2) The brake arm must be rigid, whereas most prior-art brake arms tend to be flexible, especially when large braking forces and high mechanical advantages act on them. Longer arms give greater mechanical advantage, but their added length means that they are less rigid. This loss in rigidity counteracts the otherwise expected increase in braking effectiveness. Attempts to stiffen long arms add intolerable weight.

(3) The brake arms must be securely, strongly, and rigidly mounted to the frame. Securement by clamps results in looseness and brake mushiness, as well as susceptibility to damage under rough conditions, and in displacement that destroys braking effectiveness.

(4) The brake must have strong centering forces and high resistance to deflection forces, because of the rugged environment that imposes strong demands on the centering equipment. Poor centering results in friction and gross wear. Mud must be counteracted or got rid of.

(5) The brake needs strong spring tension as part of the centering force but also. requires adjustability of each arm to obtain balance, and adjustments must be performed rapidly and with a standard tool, such as a light wrench that can be carried along. Different brake levers require different spring adjustments; different riders have different preferances; many riders feel that the tensions on the rear-wheel brake must be different from those on the front-wheel brake. Powerful jolts from chuck holes, rocks, etc. may require instant readjustment. Factory settings, therefore, are rarely satisfactory and are likely to remain satisfactory only for a short period of time.

(6) The brake must have a structure that renders damage unlikely. When a brake arm projects out beyond the frame, it is liable to be damaged quickly and severely and to become a safety hazard.

(7) The brake structure must be able to withstand the severe conditions imposed by the trails and open-country routes that mountain bicycles must endure, and also adverse weather conditions. The brake must be so placed, assembled, and structured that it will be able to endure mud without heavy accumulation or build-up thereof and to do so without being rendered inoperative or subjected to undue wear.

(8) the brake must be capable of quick release. The brake pads engage narrow rims, and the tires are wide. Narrow tires automatically enable easy release, but wide tires impede release from the brakes, and the brakes require special structure in order to enable quick release. It is usual in mountain bicycle races for the racer to have to make tire repairs, and time lost in taking off the wheel is significant. Prior-art brakes offer little help. Quick release is also useful for transporting the bicycle, for the wheel can be quickly removed so that the bicycle will fit into a car.

(9) Rapid and *complete* brake pad adjustment is needed. Many brakes are adjustable to some degree, but not in enough ways to solve the problems encountered by mountain bicycles.

(10) Asymmetric mounting of the brake pads, with most of the pad extending *away* from the frame and toward the direction of travel, is very desirable, especially for aiding in quick release, discussed in (8) above. Heretofore, asymmetric mounting has generally been in the reverse direction, which enabled mud buildup rather than reducing it.

(11) On the rear wheel brake, mounting at the *bottom* of the chain stays enables lessening of the mud problem, while mounting above the chain stays results in mud build-up. Chainstay mounting is also preferred because it is more rigid than seatstay mounting, for chainstays are shorter and thicker.

These eleven requirements call for a generally integrated solution. The brake parts should cooperate to achieve the needed results. An important object of the invention is to provide this integrated solution.

Among the other objects of the invention are the following: to provide an improved caliper brake for use on bicycles having wide tires; to provide for individual spring adjustment for each shoe of a caliper brake, while providing such spring adjustment in a way that resists misalignment; to provide braking force that increases dramatically in proportion to the deflection of the brake handles; to provide improved mounting of each caliper arm of a brake; to provide an improved quick release mechanism for a caliper brake; to protect the brake mechanism against damage or malfunction due to mud, water, and other exposures; to provide a brake mechanism that projects out a minimum amount, if any, from the bicycle frame; to provide an improved brake-pad mounting system enabling adjustment for most, if not all, adjustment needs; to provide for adaptability of the brake to a wide variety of bicycle types and sizes; to provide for an improved cable-to-cam attachment mechanism; and to provide for a rear brake capable of mounting on the frame portion parallel to the chain while avoiding mud buildup.

Other objects and advantages of the invention will appear from the following description of some preferred embodiments.

SUMMARY OF THE INVENTION

The invention provides a novel caliper brake for wide-tire mountain bicycles.

A pair of stationary pivot posts is rigidly secured directly to the bicycle frame, one on each of the opposite sides of the tire and tire rim. Each post preferably has a threaded outboard end or a threaded opening thereinto. The post is preferably stepped to provide a pair of shoulders, and a cylindrical bushing is rotatably mounted on each post inboard of the threaded outboard end. This bushing is shorter than the distance between the two steps or shoulders. A caliper arm has an intermediate pivot opening press-fitted to th bushing, to rotate therewith when a cam-facing end of the caliper arm is moved, thereby moving also a shoe at the other end of the caliper arm. The bushing is longer than the arm is thick, so that the arm can be pressed in to different levels, in order to adjust the cable pull line to exert a direct planar pull on the arm.

An important feature of the invention is the combination of a return spring with retention means therefor than enables rapid and easy adjustment with a standard tool, such as a simple wrench. The spring has one end secured relative to the post, and its other end acts anywhere on the caliper arm to exert a return force thereon. The retention means retains the spring in a stationary position relative to the post but includes means enabling purposeful adjustment of that position, while at all times enabling rotary movement of the bushing relative to the spring. This structure encompasses several possible embodiments.

One embodiment comprises a linear spring with one end coiled just enough to lock it to a keyed member that is clamped between a shoulder of the post and a nut threaded on it; the keyed member is adjustable without disturbing the nut, by applying a wrench to it. This keyed member may be a special hexagonal nut having a structure that locks it to the linear spring.

In another very good embodiment of the invention, a flat plate washer is mounted rotatably around each post, abutting an outer shoulder so as to space it somewhat from the outboard end of the bushing, and a nut and washer assembly are used to clamp the flat plate washer against the outer shoulder so as to retain the washer in a stationary but adjustable position relative to the post, while enabling relative rotary movement of the bushing relative to the washer. One end of a linear wire spring is secured rigidly to the plate washer; the spring end extends out therefrom toward the cam-facing end of the caliper arm.

In order to preserve rigidity and avoid flexibility while providing the needed application of force to the brake, the caliper arms are made to be rather short, and a cam system is used to obtain mechanical advantage and to increase the mechanical advantage as the brake levers are used to increase braking force.

A roller-mounting post is secured to the cam-facing end of each caliper arm and is preferably engaged by the outboard end of the wire spring. A round cam roller is mounted rotatably on each roller mounting post, between the spring and the caliper arm. Each roller is preferably mounted on its roller-mounting post by means of a low-friction bearing. This may be a sealed ball or roller bearing, or a lubricated bushing, such as a sintered bronze bushing impregnated with oil. A series of roller-mounting-post-receiving openings may be provided at the cam-facing end of the caliper arm, to increase the versatility of the braking assembly. A cam plate having two opposite cammed edges is mounted with those edges in engagement with grooves in the rollers. The cam plate is shaped to flare at progressively wider angles along an arc, to provide a changing mechanical advantage that accelerates application of the brake upon pulling of the cable. A brake-actuating cable is secured to the cam plate along its central axis, preferably between it and a clamp plate facing the cam and having a cable-receiving groove; the securement is done by a clamping bolt passing through the cam and the clamp plate, so that a nut threaded on the bolt can clamp the parts together.

A brake shoe frame with a brake shoe (also called a pad or block) therein is mounted on the opposite end of the caliper arm. This brake shoe frame can take many forms. In general, it holds a brake pad which will engage the rim of the wheel. The brake shoe frame and caliper arm are structured to enable adjustment of the brake pad relative to the wheel rim.

For example, one preferable form of brake shoe frame comprises a ring having an integral threaded socket for adjustably securing it to a stud on a shoe-holding member, typically a channel, to change the longitudinal distance and the rotational position of the pad. The caliper arm preferably includes a cylindrical stem to which the ring is attached so that it can be adjusted both lengthwise of the stem and rotationally of the stem, there being a clamping means for releasably clamping the ring to the stem rigidly when the desired adjustment has been made.

The shoe-holding channel is, preferably, asymmetrically secured to the stem, so that the shoe therein extends further on one side of the stem than on the other. This can be used (1) to minimize the amount of flex in the stud that is secured to the bicycle, by keeping the stud short so that the brake pads are normally as close to the fork blades or chain stays as they can be while providing the proper clearance, thereby giving good stiff braking characteristics, (2) to facilitate quick release of the wheel from the frame when needed and actuated by the rider, by helping the brake shoe to swing clear of the chainstays or fork blades, and (3) to minimize the amount of projection of the shoe beyond the frame.

Preferably, one side face of each caliper arm describes a smooth arc, whereas the other side face is scalloped to narrow the caliper arm in between the pivot opening and each of its ends. In order to make the caliper arm lighter in weight, a series of openings may extend through the caliper arm from the top face to the bottom face or there may be recesses.

BRIEF DESCRIPTION OF THE DRAWINGS

FIG. 1 is a view in side elevation of a wide-tire bicycle having front and rear caliper brakes embodying the principles of the invention. A portion of the seat tube is broken off for the sake of clarity.

FIG. 2 is a fragmentary view in front elevation of the bicycle of FIG. 1, showing the handlebars and adjacent parts.

FIG. 3 is a view in section taken along the line 3—3 in FIG. 4.

FIG. 4 is an enlarged fragmentary view in end elevation of a portion of the front fork of the bicycle frame of FIG. 1 having a front brake embodying the principles of the invention and showing the relation between it and the wide tire and frame.

FIG. 5 is a fragmentary view in side elevation taken along the line 5—5 in FIG. 4.

FIG. 6 is a fragmentary view in side elevation of the rear wheel area of the bicycle with some parts removed to show others more clearly, and showing a rear brake embodying the principles of the invention.

FIG. 7 is an enlarged view in section taken along the line 7—7 in FIG. 6.

FIG. 8 is a fragmentary view in perspective and partly in section showing the attachment of the asymmetric brake shoe assembly to its supporting structure.

FIG. 9 is a view in section taken along the line 9—9 in FIG. 5.

FIG. 10 is a view in section taken along the line 10—10 in FIG. 5.

FIG. 11 is a view similar to FIG. 4 illustrating the position of the brake after a quick release.

FIG. 12 is an enlarged view in section taken along the line 12—12 in FIG. 5.

FIG. 13 is an enlarged view in side elevation of the rollers on the opposite side of the caliper arm from what is shown in FIG. 5.

FIG. 14 is a view like FIG. 9 of an alternative pivot post structure.

FIG. 15 is a view in front elevation of an alternative form of caliper arm with recesses, instead of openings, lightening the arm.

FIG. 16 is a view in cross section of another form of caliper arm with side grooves instead of through openings.

FIG. 17 is a fragmentary view of the roller end of the caliper arm showing an alternative bearing structure.

FIG. 18 is a fragmentary enlarged view in section of a modified form of linear return spring with a modified form of spring retainer and the pivot post, bushing, and part of the caliper arm, and a portion of the frame.

FIG. 19 is a bottom view of a modified form of return spring and spring holder, taken as a section through the line 19—19 in FIG. 18, with a washer partly broken away.

FIG. 20 is a view of the caliper arm and related parts on a smaller scale, looking along the line 20—20 in FIG. 18, employing the members of FIG. 18, with the return spring shown in flexed position.

FIG. 21 is a fragmentary view in side elevation of the frame and the rear-wheel brake assembly, showing the pivot post and the caliper arm assembly aligned with the cam and cable, showing how the bushing-caliper arm press fit makes accurate alignment possible.

FIG. 22 is an enlarged view of two cams superimposed; the rear-brake cam having a steeper cam angle is shown in broken lines beneath the front-brake cam, which is shown in solid lines.

FIG. 23 is a view in perspective similar to FIG. 8 of a modified form of brake shoe mounting assembly.

FIG. 24 is another view in perspective of the structure of FIG. 23, looking from a different viewpoint.

DESCRIPTION OF SOME PREFERRED FORMS OF THE INVENTION

FIG. 1 shows a typical wide-tire bicycle 20 having a main frame 21 provided with a head tube 22, a downtube 23, a seat tube 24, a pair of chain stays 25, a pair of seat stays 26, and a top tube 27. At the front end, a fork 28 is rotatably mounted in the head tube 22 and provides support for a front wheel 30, while its upper stem 31 supports the handlebar 32. At the rear, the chain stays 25 and the seat stays 26 meet at a support member 33, usually called a rear dropout, for a rear wheel 34. The support member or rear dropout 33 may have a slot 35 or a series of openings enabling adjustment of the position of the rear wheel 34. There are also the usual pedals 36 mounted on crank arms 39, a sprocket wheel 37, and a chain 38.

The fork 28 supports a front brake 40 adjacent the rim 41 of the front wheel 30, while the frame 21 supports a rear brake 42 adjacent the rim 43 of the rear wheel 34. In most ways the front brake 40 and the rear brake 42 are identical.

A feature of the present invention is that the rear brake 42 is preferably supported below and by the chain stays 25 rather than by the seat stays 26, although it may be supported on the seat stays 26 if desired. Support by the seat stays 26 is usually considered advantageous in avoiding outward projection of the brake 42 at an awkward place. In fact, the chain stays 25 cannot be used to support most caliper brakes, because they would then interfere with operation of the chain 38 and the crank arms 39, whereas that is not true in the present invention due to the brake structure. If the brake 42 were supported *above* the chain stays 25 rather than below them, mud could be picked up by the rear wheel 34, carried around about 270° and deposited on the brake, to the great detriment of brake positioning and wear. Being beneath the chain stays 25, the brake 42 is protected from this mud, and any mud that reaches it at least tends to drop off or be carried downwardly by the wheel 34. This location is therefor quite important.

Each brake 40, 42 is actuated by a respective hand-operated lever 44, 45 (see FIG. 2) near the grips on the opposite ends of the handlebar 32. Each brake lever 44, 45 is supported on a support mechanism 46 at a pivot 47, and pulling in on the lever 44 and 45 acts to pull upon respective cables 50 and 51, most of each of which is encased. At the front end for example, the encased end of the cable 50 ends at a stabilizing bracket 52 that is suspended from the upper stem 31 of the fork 28, and from there on the cable 50 is bare down to the front brake assembly 40. (See especially FIGS. 1, 4, and 5.) In place of using the bracket 52, the cable 50 may fit into a socket inside the stem 31. The cable 51 passes down beside or through the downtube 23 and around a round pedal support or bottom bracket 53 having a single guide mounted thereon, and then passes between the chain stays 25 to the brake 42.

The brake 40 or 42 of this invention comprises a pair of stationary pivot posts 55, each rigidly secured directly to the frame, i.e., the two posts 55 of the front brake 40 are secured on to each blade 56, 57 of the fork 28 beyond a shoulder 58 (FIGS. 5 and 9). The two posts 55 for the rear brake are mounted on the two chain stays 25 (or on the two seat stays 26, if desired). The pivot posts 55 lie on opposite sides of the wheel 30, so that the brake shoes can engage opposite sides of the tire rim 41. Each of these posts 55, which is preferably brazed to the frame and becomes integral with it, preferably has a reduced-diameter, threaded outboard end 59 (FIG. 9).

A cylindrical low-friction bushing 60 is rotatably mounted on each of the posts 55 inboard of this threaded outboard end 59, and a caliper arm 61 is, preferably, press-fitted to the bushing 60. The caliper arm 61 has an intermediate pivot opening 62 where the press fit takes place. The press fit of the arm 61 to the bushing 60 serves a special function. The bushing 60 is made substantially longer than the arm 61 is thick. Thus, they can be press-fitted together at different relative positions and thereby the arm 61 can be located on the post 55 in a position perfectly aligned relative to the brake cable 50 or 51, to give the ideal true alignment, discussed below. Also, if the pivot posts 55 are, accidentally, attached to the frame 56, 57 or 25 inaccurately and are not perfectly parallel, the bushings 60 and caliper arm 61 can be pressed together to the levels needed to bring the cam rollers 77 (discussed below) into the same single plane, so that the cam 80 (described below) fits properly into the grooves of the rollers 77.

As shown in FIG. 9, the posts 55 each have two shoulders 63 and 64, which are slightly further apart than the length of the bushing 60. One shoulder 63 is near the base of the post 55, while the other shoulder 64 is at the base of the reduced-diameter threaded outboard end 59. This insures against binding of the bushing 60 and resultant binding of the caliper arm 61.

The caliper arm 61 has two opposite extremities: a shoe attachment end 65 and a cam facing end 66. Between the opening 62 and the cam facing end 66, there may be drilled openings 67 to lighten the arm 61. Alternatively, as shown in FIG. 15, the caliper arm 61 may be inwardly recessed from both front and back by a central recess 110-each recess 110 extending in about one-third of the thickness of the arm 61. Another alternative, shown in FIG. 16 is to provide grooves 111 and 112, one on each side edge of the caliper arm 61, to lighten the structure.

In the form of the invention shown in FIGS. 4, 5, 7, 9, 11, and 13, a flat plat washer 70, preferably rectangular but in any event polygonal and not round or curved, is placed around each of the posts 55 and rests against the outboard shoulder 64. Clamping means is provided for clamping that flat-plate washer 70 against the shoulder 64, so as to retain the flat-plate washer 70 in a stationary but adjustable position relative to its pivot post 55, while enabling relative rotary movement of the bushing 60 relative to the flat-plate washer 70. The clamping means preferably comprises a nut 71 and a washer 72 (see FIG. 9), the nut 71 being threaded on the threaded end 59 of the post 55, the washer 72 being clamped between the nut 71 and the flat plate washer 70. A linear wire spring 73 having one end secured rigidly to the plate washer 70 extends out toward the cam-facing end 66 of the caliper arm 61. The spring 73 may be pressed into a split socket tube 73a, if desired, in order to enable replacement of the spring as an element. The spring 73 need not be completely linear; it may have, for example, a single 360° coil therein. It is possible, by loosening the nut 71, to adjust the rotational position of the flat plate washer 70, and thereby adjust the tension on the spring 73, but adjustment can be done even more simply by a wrench that engages the edges 74 of the polygonal flat plate washer 70 and rotates it relatively to the post 55. In either event this is done without rotating the bushing 60, due to the clearance between the washer 70 and the bushing 60.

FIG. 14 shows an alternate structure performing the functions of the double-stepped post 55. Here a single stepped post 100 has a base shoulder 101 and an outer end 102 and interior threads 103 leading in from the outer end 102. The bushing 60 is shorter than the distance from the base shoulder 101 to the outer end 102. The plate 70 bears against the end 102 and is held there by a washer 104 and a machine screw 105 extending into the interior threads 103 and having a head 106. The operation is substantially the same as in FIG. 9.

FIGS. 18–20 show another form of linear spring attached to a keyed member that is easily moved without loosening the clamping means. As best shown in FIG. 19 a spring 130 has, at its post end, a curved post-encircling portion 131 ending in a straight segment 132. The segment 132 extends through an opening 133 in a generally cylindrical member 134 having a hexagonal head 135. Other methods of attachment are, of course, possible. The spring 130 is thereby held in a fixed position, as by a socket head screw 137 which threads into a threaded opening at the end of the pivot post 138 that is brazed to the frame member 57. A spring steel washer 136 bears against the member 134 and helps protect the pivot post 138 from deformation by the hardened spring 130, and it also enhances the friction characteristics. However, a wrench with a hexagonal head or a crescent wrench can move the head 136 and thereby adjust spring tension.

The cam facing end 66 of each caliper arm 61 is provided with one or more openings 75 and 75a, for example, any one of which may receive a roller-mounting post 76 which may be a threaded bolt secured rigidly to the caliper arm 61 at the chosen position. When one knows for certain the specifications of the bicycle to which the brake 40 or 42 is to be applied, there need be only one such opening 75, but otherwise adjustment to any of various bicycles is enabled by providing more than one such opening. The spring 73 bears against a bushing 68 on this post 76. A cam roller 77 (see FIG. 10) is mounted rotatably by a bearing, preferably a sealed low-friction bearing such as a ball bearing 78 on each of the roller mounting posts 76, in between the caliper arm 61 and the place where the spring 73 bears against a bushing 68 on the post 76.

FIG. 17 shows an alternative structure in which the cam roller 77 is press-fitted on a self-lubricating bushing 115—for example, a structure of sintered bronze containing lubricant with which the bronze powder is mixed before sintering. This bushing 115 is rotatably mounted around a steel bushing 116, which slides over the post 76. A nut 69 forces another bushing 117 and a washer 118 to bear against the bushing 116. The spring 73 bears against the bushing 117. This structure also resists mud and other problem-causing foreign matter.

The outboard end of the piano wire or other linear spring 73 presses against the post 76 or, if desired upon the bushing 68, around the post 76, this bushing 68 and roller 77 being held on the post with the aid of the small nut 69. The post 76 may be mounted in any of various holes or openings 75, 75a etc. in the end of the caliper arm 61, in order to compensate for variations in the spacing of the post 55, as required by different kinds or models of bicycles. As a result, the same cam plate 80 can be used even when the post spacing is changed.

Each roller 77 preferably has a circumferential groove 79 and faces a cam plate 80. The groove 79 engages one of the two opposite edges 81 and 82 of the cam plate 80. If desired, the groove can be in the cam plate instead; these are basically equivalent structures. FIG. 21 shows that the cable 50 is aligned (by means of the press-fitting of the bushing 60 in the arm 61) to give a straight cable pull via the arm 80.

The cam plate 80 is preferably shaped so as to give a geometrical effect whereby pull on the cable 50 or 51 acts quickly to engage the brake 40 or 42, and the further the cable 50 and 51 is pulled the greater the degree to which the brake 40 or 42 is tightened in its braking position. FIG. 22 illustrates, in solid lines, a cam 80a for the front brake 40 and, in broken lines, a cam 80b for the rear brake 52. This increase in mechanical advantage may be linear or non-linear, depending on the shape of the cam edges. Most knowledgeable off-the-road riders prefer to have the rear brake 42 be more powerful than the front brake 40, for such a bias in brake sensitivity gives better control of the bicycle 20. Thus the cam 80b for the rear brake 42 has a narrower ramp angle $\theta$ than the cam 80a for the front brake 40, which has a broader ramp angle $\phi$.

Thus, as shown in FIG. 11, each edge 81 and 82, of the cam plate 80 includes a depression 87 for the rollers 77, so that the brake pads are well retracted from the tire rim in the unactuated state of the brake. This is followed by a brake actuation ramp 88 that progressively moves the brake pads toward the rim, and it ends at a safety stop 89 to prevent the cam plate 80 from pulling out all the way and detaching itself from the rollers 77.

The cable 50 or 51 is secured to the cam plate 80 along the plate's central axis, preferably, as shown in FIG. 12, by the use of a clamp plate 83 having a cable-receiving groove 83a, a bolt 84, with an allen head 85, and a nut 86. The bolt 84 extends through both the cam plate 80 and the clamp plate 83, so that they can be forced toward each other to hold the cable 50 or 51 firmly in place between them and in the groove 83a without damage to the cable. This also enables adjustment relative to the cable 50 or 51 when that is necessary. Quick release is discussed below.

Because there are two separate return springs 73 for the brake 40 or 41 and because these springs 73 are separately and independently adjustable it becomes possible to adjust the actuator cable tension readily and thereby to adjust the hand lever control return tension. Moreover, the adjustment can operate over a very wide range, even though it is provided by a very simple structure. Each wire spring 73 may be stiff piano wire, and its attachment to the flat-sided flat plate washer 70 may be by pressing it into the split hollow tube 73a, which is, itself, attached to the flat plate 70 by brazing or by welding, or the two parts may be made initially as a single piece, though that is somewhat expensive unless a large number are to be made. The inside diameter of the flat plate washer 70 is about the same as the outside diameter of the threaded outboard portion 59 of the cylindrical stud on pivot post 55, so that it fits onto that threaded portion 59 and is held tightly against the shoulder 64 by the lock nut 71 and washer 72. However, when a wrench is engaged with the flat sides 74 of the washer 70 it can be turned in either direction quite rapidly to increase or decrease the spring tension on the corresponding caliper arm 61; the lock nut 71 holds the position of the washer 70 once it has been adjusted, and no further loosening or tightening is needed. In any event both this spring 73 and that of FIGS. 18–20 employs friction holding that enables rapid adjustment by a standard wrench.

The linear type of spring is preferred because of the great force it gives to urge return of the arm 61, but other types may be used with less desirable results. With the linear spring small angles of deflection produce large rotating forces that help to make spring adjustment precise as well as easy; it is also highly effective in preventing changes in the pad-to-rim clearance, as may be caused if mud should build up or if one of the bearings becomes sticky. When a force acts on one of the arms 61 of a pair, that force is transferred through the cam 80 to the other arm 61 of the pair, so that its spring 73 also contributes force helping toward proper alignment and centering.

Each caliper arm 61 retains a brake shoe holder 90 at the opposite end 65 of the arm 61 from the cam plate 80. This holder 90 may be a standard brake shoe holder with a standard brake shoe in it, or it may be, and preferably is, the illustrated brake shoe holder 90. In this instance, the end 65 of the arm 61 is a cylindrical stem 65, (see FIG. 8) on which a set screw, preferably, or a clamp 91 is mounted for adjusting the position of the holder 90 relative to the stem 65, both as to its rotational position and its longitudinal position relative to the caliper arm 61. Preferably, a brake shoe 92 (also called a pad or block) is fitted into a channel of the holder 90 or is bonded to a flat recessed surface of the holder 90. The holder 90 may include a ring 94 (FIG. 5) which is slidable along and rotatable along the stem 65 and is held in a desired position there by the member 91, which may be a U-shaped clamp acted on by a nut-bolt-washer combination 95, the bolt really being a threaded member secured to and forming part of the ring 94. The ring 94 may have an interiorly threaded socket to receive a projecting threaded stud 96 of a retainer member 97, so that the distance of the retainer 97 from the ring 94 is adjustable with the aid of a lock nut 98, as is its relative rotational position. These are both important adjustments, enabling compensation for wear of the pad 92 by lengthening the distance from the ring 94 to the retainer 97 and varying the rotational position to conform to the structure of the bicycle and the desired meeting of the pad 92 and the rim 41 or 43 of the wheel 30 or 34.

Preferably, the retainer 97 is asymmetric with respect to the stud 96, as shown in FIG. 5, so that it extends more to the side of the stud 96 which is away from the frame 21 than on the side which is toward the frame 21, thereby enabling the avoidance of outward projection of the shoe 92 and holding the assembly closer inboard, for the desired stiffness of the brake. Just as important is the fact that due to this asymmetric mounting, the shoe or pad 92 and the holder 90 do not tend to strike the frame 21 during quick release. This prevents any engagement with the frame at that time, as will be discussed further below.

This preferred but not essential structure of the shoe or pad holder 90, with its ring 94, the stud 96 and the lock nut 98 and its adjustable clamp 91, affords great versatility in the location of the brake pad 92, providing four kinds of adjustment. Its asymmetrical pad retainer 97 enables the brake pads 92 to swing past the chain stays 25 or the blades 56 and 57 of the fork 28 when the brake 42 or 40 is in the quick release mode, thereby enabling easy removal of the wheel from the bike.

The pad location is adjustable in various directions. Thus, the pad holder 90 can be moved along the axis of the caliper arm 61, (see FIG. 8), an adjustment which is needed on those bicycles which use horizontal rear dropouts 35. Such bicycles are built with horizontal dropouts 35, because frame alignment is less critical, because the frame can be built less expensively, and because the wheel 30 can thereby be moved to different locations to product different handling characteristics in the bicycle. Each wheel 30 or 34 may be put in slightly different locations, and the padholder 90 must be moved along the axis of the arm 61 in order to keep the pad-to-rim position correct.

The structure of this brake 40 or 42 enables the pad 92 to be easily "toed in", (see FIG. 3), as is sometimes necessary to prevent the brake 40 or 42 from making a squealing sound. The versatility of this structure makes it possible to optimize each installation and to re-optimize it as needed according to the particular circumstances.

To summarize the novel pad mounting and adjusting system, which is able to adjust the pads positively, without slipping, in all four necessary axes:

(1) The pad 92 can be translated along the stem 65 of the caliper arm 61 to accommodate different diameter wheels 30 of 34 to accommodate horizontal movement of the same wheel, (B 2) The shoe or pad 92 is readily toed-in or toed-out by rotational movement of the ring 94 in the stem 65, (3) The pad 92 can also be rotated about the axis of its mounting stud 96 so that the pad 92 is always aligned with the rim, regardless of where the caliper arm 61 is mounted, and (4) The pad-mounting stud 96 can be screwed in or out of its socket in the ring 92 to compensate for wear of the pad 92.

An alternative way of affording some of the adjustments of the pad holder 90 is for the ring 94 to be rigidly and non-adjustably attached to the retainer 97, by the bicycle manufacturer or builder brazing them together in the correct position after the brake is installed.

The quick release mechanism of this brake system is very simple. All that needs to be done is to pinch the two pads 92 or the shoe holders 90 of each brake 40 or 42 together by hand. This quickly frees the cam plate 80 from the roller grooves 79, (see FIG. 11), and the cam plate 80 is than either automatically, or at least easily, removed from them. Then one releases the pads 92 or shoe holders 90 and they spring out (under the urging of the springs 73) with an unusually large spread, so that the large diameter tire easily goes out between them. The asymmetric pad mounting assists in doing this. This is used whenever one is repairing a puncture or for other reasons removing the wheel 30 or 34.

It should be noted that the return spring system of the present brake resists the force necessary to deflect the pads 92 from their proper location. Such a force may be exerted by mud buildup, and in prior brakes the resistance to this force was insufficient to resist deflection of the pad or the brake arm. Here, however, the spring system acts to provide a positive pad-centering system without the need for any additional mounting member, as was before required. Therefore, this invention gives great versatility with great simplicity and very light weight, while at the same time the caliper arms 61 are very rigid, since the main pivot posts 55 are mounted directly to the fork blades 56 and 57 or chain stay 25 of the bicycle frame.

FIGS. 23 and 24 show an alternative structure for mounting the brake pad holder. Along the stem 65 are mounted a collar-like clamp 140 and a slidable split block 141. The block 141 has a cylindrical through opening 142 that receives and holds a cylindrical rod 143 which is secured to a brake pad holder 144. The pad holder 144 may be a standard such holder and has a channel 145 that receives and holds a pad 146.

The clamp 140 has a spaced apart pair of clamp arms 147 and 148, both extending out from a single end portion 150 in a loop and each having an arcuate, preferably semicircular portion 151, 152 that engages and is clamped to the stem 65. The block 141 has an arcuate portion 153 that engages the other side of the stem 65 and faces the arcuate portions 151 and 152. An open slot 154 of the block leads into the through opening 142. A socket-head screw 155 is threaded into a threaded through opening in the end portion 150 and engages an end wall 156 of the block 141, which is on the opposite side of the block 141 from the arcuate portion 153.

In assembly, the block 141 is inserted into the clamp 140 next to the end portion 150, and there the arm-block combination is placed on the stem 65. The rod 143 is set into the opening 142. When all parts are in their proper position an hexagonal-end wrench tightens the set screw 155 so that its inner end bears on the end wall 156 and tightens the block 141 and also the clamp arms 151 and 152 against the stem; it also partially closes the slot 154 and tightens the block firmly on the said rod portion 143.

Thus, there is adjustment linearly and rotationally of the clamp-block-pad holder continuation along and around the stem 65. Moreover, there is asymmetric mounting of the pad 146 whether or not the rod 143 is asymmetrically mounted on the pad holder 144. Also the rod 143, is whenever the block 141 is not fully tightened around it, movable longitudinally and rotationally relative to the block 140.

Note that the rollers 77 rely on sealed lowfriction bearings 78 or on permanently lubricated bushings 115, and are therefore protected from the action of water, dirt, and mud.

When mounting either the rear brake 42 or the front brake 40, it is desirable to align the roller pulleys with the actuator cable "pull line" (see drawing). This insures that the cam plate 80, to which the actuator cable 50 or 51 is attached, moves smoothly between the pulleys and does not bind. The proper alignment is accomplished as follows: the main pivot bushing 60 can be pressed to different levels in the caliper arm 61. Since the bushing 60 is ¾" long and the arm 61 is only about ½" thick this affords ¼" of position change in the pulley. (See FIG. 21.)

The pulley can also be mounted on either side of the arm 61: (compare FIG. 13 with FIG. 5; these views also show that).

The left and right caliper arms 61 can also be interchanged and turned over to yield even more possibilities for the pulley location. Thus, with one face 120 of the arm 61 flat and the opposite face 121 sloped or tapered from a thick portion at and near the opening 62, to a thin portion at and near the rollers 77, the distance between the rollers 77 and the fork blades 56 and 57 can be markedly changed.

By using each of the above methods by itself or in combination with each other all possible pulley location requirements can be met.

For retrofit or replacement the brake can be supplied as a kit for bicycles already having the pivot posts, or pivot posts 55 can be supplied for brazing them to the frame. The kit includes four identical bushings (such as the bushings 60), four caliper arms 61 (which may be identical or may be in two pairs with right and left head arms), four identical return springs, preferably linear springs with flat-end polygonal spring holding members (e.g., either flat plates or hexagonal-headed members like that shown in FIGS. 18–20), suitable retention means for each spring, four identical brake shoe holders 90, four identical roller mounting posts 76, four identical cam rollers 77 (which may be pre-mounted on the caliper arms 61), and two cam plates 80 (preferably with differently sloped cam edges, one for the rear brake and one for the front brake. Except for the brazing operation, the brakes are then easily assembled and retrofitted in place.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A caliper brake for wide-tire bicycles having a frame and wheels with a narrow rim and a tire wide relative to the rim, including in combination
    a pair of stationary pivot posts rigidly, permanently, and immovably secured directly to said frame, one on each of the opposite sides of the tire and rim,
    a caliper arm for each said pivot post having an intermediate pivot portion rotatably mounted on said pivot post, a shoe-attachment end on one extremity, and a cam-facing end at its other extremity,
    a separate return spring for each pivot post, each having one end adjustably secured relative to said pivot post and a second end acting on said caliper arm to exert a return force thereon,
    a polygonal keyed retention means for frictionally retaining said spring in a stationary position relative to said pivot post while enabling purposeful adjustment of that position at all times while said retention means is fully tight, and at all times enabling relative rotary movement of said spring relatively to said pivot post,
    a brake shoe holder with a brake shoe therein, mounted on the shoe-attachement end of said caliper arm,
    a roller-mounting post secured to the cam-facing end of each said caliper arm,
    a cam roller mounted rotatably on each said roller mounting post and having a circumferential groove therein,
    a cam plate having two opposite cammed edges in engagement with said grooves in said rollers, said cammed edges being shaped to cause substantial increases in force the further said cam plate is moved during brake application relative to said cam rollers, and
    a brake-actuating cable secured to said cam plate along the central axis thereof for moving said cam plate relative to said cam rollers and thereby to spread said cam rollers apart and force said brake shoes inwardly,
    said bushing enabling alignment of said caliper arm thereon with said cable.

2. The brake of claim 1 wherein
    each said return spring is a spring with its active part, the part which flexes during its use cycle, being substantially linear and straight when in its relaxed state and an outboard end engaging and pushing on said roller-mounting post with a strong spring force increasing at a high rate due to the linear structure and tending to urge that roller mounting post toward the one on the other caliper arm, and
    said retention means comprises
    a polygonal keyed member to which said spring is secured, and frictional means for holding said keyed member stationary relative to said pivot post, while enabling purposeful rotation thereof by a standard wrench, for adjusting the spring tension on said roller-mounting post by adjusting the rotational position of said keyed member relative to said pivot post.

3. The brake of claim 2 wherein
    said polygonal keyed member is a flat plate having, brazed thereto, a split sleeve, and
    said linear wire spring extends into said split sleeve and is held rigidly, though removably, therein.

4. The brake of claim 2 wherein said polygonal keyed member is a hexagonal headed nut with a passage therethrough into which an end of said linear wire spring extends, said spring having an arcuate portion leading to said spring end.

5. The brake of claim 1 wherein said brake shoe holder comprises
    support means,
    shoe retaining means,
    attachment means for securing said support means to said shoe-retaining means for adjustment of the spacing of the shoe in said shoe retaining means from said support means and for rotation relative to each other, to rotate the position of the shoe relative to said support means,
    positioning means for securing said support means to said caliper arm for adjustment lengthwise of the support means on said caliper arm and for adjustment rotationally of the support means relative to the lengthwise centerline of said caliper arm, and
    clamping means for releasably clamping said support means rigidly to said caliper arm when adjustment has been made,
    whereby the position of the shoe relative to said caliper arm can be adjusted lengthwise and rotationally by the movement of said support means relative to said caliper arm and the spacing of the shoe relative to said support means and the rotational portion of said shoe relative to said support means can also be separately adjusted,
    said shoe retaining means being asymmetrically secured to said support means, in a way such that the shoe retaining means extends to one side of the support means and away from the portion of said frame supporting said post and on the forward side of said frame portion relative to the direction of travel of said bicycle, so that the rim moves toward the shoe after passing said frame portion and so that upon release of said cam from said rollers said shoes can be forced apart from each other by said return springs for removal of the wide tire without interference from said shoe retaining means and said frame.

6. The brake of claim 1 wherein said shoe-holder is asymmetrically secured to said caliper arm, so that the shoe therein extends to one side of said caliper arm and away from said frame on the other side, of said portion supporting said post in the direction toward which said wheel and rim are moving, where it is so spaced that it does not engage said frame when said cam rollers are released from said cam and said caliper arms are moved apart from each other by said return springs.

7. The brake of claim 1 wherein each said caliper arm has a plurality of roller-mounting post-receiving openings at its said cam-facing end, any one of which may be chosen for use.

8. The brake of claim 1 wherein said cam plate edges are shaped to provide
- a pair of depressions at the end of said cam plate nearer said cable, in which said rollers normally rest when the brake is not engaged and which act upon release of said brake to accelerate retraction of said shoes from said rim,
- a brake actuation ramp for non-linear accelerating engagement of the brake, providing means causing the brake caliper arms to move quickly from said depressions so that said shoes move up to said rim, and, when said shoe is in contact with said rim, to move more slowly but with greater mechanical advantage as the shoe is clamped more tightly on said rim and causing said brake calipers to act oppositely therefrom when said brake is released, and
- a safety stop at the end of said cam plate further from said cable to prevent accidental disengagement of the rollers and edges at the extremity of the brake stroke.

9. A caliper brake for wide-tire bicycles having a frame and wheels with a narrow rim and a tire wide relative to the rim, including in combination
- a pair of stationary pivot posts rigidly, permanently, and immovably secured directly to said frame, each said pivot post being brazed to said frame to secure complete rigidity therewith and one on each of the oppostie sides of the tire and rim,
- a cylindrical bushing rotatably mounted on each said pivot post,
- a caliper arm having an intermediate pivot portion separate from but snugly affixed to each said bushing to enable adjustment of the position of the arm on said bushing relative to the axis of said bushing, a shoe-attachment end on one extremity, and a cam-facing end at its other extremity, each said caliper arm being press-fitted to its said bushing, to enable said adjustment relative to the axis of said bushing at a time of alignment while otherwise said bushing is firmly retained in relation to said caliper arm and enabling low-friction rotation of said bushing with said caliper arm relative to said pivot post,
- a separate return spring for each pivot post, each having one end adjustably secured relative to said pivot post and a second end acting on said caliper arm to exert a return force thereon,
- retention means for frictionally retaining said spring in a stationary position relative to said pivot post while enabling purposeful adjustment of that position at all times and at all times enabling relative rotary movement of said bushing relative to said spring,
- a brake shoe holder with a brake shoe therein, mounted on the shoe-attachment end of said caliper arm,
- a roller-mounting post secured to the cam-facing end of each said caliper arm,
- a cam roller mounted rotatably on each said roller mounting post and having a circumferential groove therein,
- a cam plate having two opposite cammed edges in engagement with said grooves in said rollers, said cammed edges being shaped to cause substantial increases in force the further said cam plate is moved during brake application relative to said cam rollers, and
- a brake-actuating cable secured to said cam plate along the central axis thereof for moving said cam plate relative to said cam rollers and thereby to spread said cam rollers apart and force said brake shoes inwardly,
- said bushing enabling alignment of said caliper arm thereon with said cable, said bushing being longer than said caliper arm is thick so that the axial adjustment of said caliper arm relative to said bushing at the time of press fitting can provide proper alignment of said cable and cam plate with the groove of said cam roller.

10. A caliper brake for wide-tire bicycles having a frame and wheels with a narrow rim and a tire wide relative to the rim, including in combination
- a pair of stationary pivot posts rigidly, permanently, and immovably secured directly to said frame, one on each of the opposite sides of the tire and rim,
- a cylindrical bushing rotatably mounted on each said pivot post,
- a caliper arm having an intermediate pivot portion separate from but snugly affixed to each said bushing to enable adjustment of the position of the arm on said bushing relative to the axis of said bushing, a shoe-attachment end on one extremity, and a cam-facing end at its other extremity,
- a separate return spring for each pivot post, each having one end adjustably secured relative to said pivot post and a second end acting on said caliper arm to exert a return force thereon,
- retention means for frictionally retaining said spring in a stationary position relative to said pivot post while enabling purposeful adjustment of that position at all times,
- each said return spring having an extended portion with an outboard end engaging and pushing on said roller-mounting post and tending to urge that roller mounting post toward the one on the other caliper arm,
- said retention means comprising
- a keyed member to which said spring is secured, and frictional means for holding said keyed member stationary relative to said pivot post, while enabling purposeful rotation thereof for adjusting the spring tension on said roller-mounting post by adjusting the rotational position of said keyed member relative to said pivot post,
- a brake shoe holder with a brake shoe therein, mounted on the shoe-attachment end of said caliper arm,
- a roller-mounting post secured to the cam-facing end of each said caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to said cam rollers, and a brake-actuating cable secured to said cam plate along the central axis thereof for moving said cam plate relative to said cam rollers and thereby to spread said cam rollers apart and force said brake shoes inwardly, said bushing enabling alignment of said caliper arm thereon with said cable, said pivot post providing two spaced-apart abutments, said bushing being mounted between them and shorter than the distance between them, said retention means urging said polygonal keyed member against one of said abutments, so that there is clearance between said keyed member and said bushing, enabling adjustment of spring tension without moving said caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to said cam rollers, and a brake-actuating cable secured to said cam plate along the central axis thereof for moving said cam plate relative to said cam rollers and thereby to spread said cam rollers apart and force said brake shoes inwardly, said bushing enabling alignment of said caliper arm thereon with said cable.

11. The brake of claim 10 in which said post has a stop near said frame comprising one said abutment and an outer end providing the other abutment and is provided with an interiorly threaded portion extending in from said outer end, said retention means comprising a machine screw threaded into said interiorly threaded portion and having a head and a washer urged by said head to engage said polygonal keyed member and force it against said outer end.

12. A caliper brake for wide-tire bicycles having a frame and wheels with a narrow rim and a wide tire, including in combination a pair of stationary pivot posts rigidly secured directly to said frame, one on each of the opposite sides of the tire and rim, each said pivot post being a twice-stepped member, the steps providing two spaced-apart abutments, one an inner abutment near said frame, the other an outer abutment with a reduced-diameter exteriorly threaded portion extending therebeyond, a cylindrical bushing rotatably mounted on each said pivot post, said bushing being mounted between said abutments and shorter than the distance between them, a caliper arm having an intermediate pivot portion separate from but snugly affixed to each said bushing to enable adjustment of the position of the arm on said bushing, a shoe-attachment end on one extremity, and a cam-facing end at its other extremity, a return spring for each pivot post having one end adjustably secured relative to said pivot post and a second end acting on said caliper arm to exert a return force thereon, retention means for frictionally retaining said spring in a stationary position relative to said pivot post while enabling purposeful adjustment of that position at all times and at all times enabling relative rotary movement of said bushing relative to said spring, said retention means comprising a polygonal keyed member to which said spring is secured and frictional means for holding said keyed member stationary relative to said pivot post, while enabling purposeful rotation thereof by a standard key-engaging tool for adjusting the spring tension on said roller-mounting post by adjusting the rotational position of said keyed member relative to said pivot post, said retention means comprising a nut threaded onto said threaded portion and a washer urged by said nut to force said polygonal keyed member against said outer abutment, said retention means urging said polygonal keyed member against one of said abutments, so that there is clearance between said keyed member and said bushing, enabling adjustment of spring tension without moving said caliper arm, a brake shoe holder with a brake shoe therein, mounted on the shoe-attachment end of said caliper arm, a roller-mounting post secured to the cam-facing end of each said caliper arm, each said return spring being a linear spring with an outboard end engaging said roller-mounting post and tending to urge that roller mounting post toward the one on the other caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to said cam rollers, and a brake-actuating cable secured to said cam plate along the central axis thereof for moving said cam plate relative to said cam rollers and thereby to spread said cam rollers apart and force said brake shoes inwardly, said bushing enabling alignment of said caliper arm thereon with said cable.

13. A caliper brake for wide-tire bicycles having a frame and wheels with a narrow rim and a wide tire, including in combination a pair of stationary pivot posts rigidly secured directly to said frame, one on each of the opposite sides of the tire and rim, a cylindrical bushing rotatably mounted on each said pivot post, a caliper arm having an intermediate pivot portion affixed to each said bushing, a shoe-attachment end on one extremity, and a cam-facing end at its other extremity, a return spring for each pivot post having one end adjustably secured relative to said pivot post and a second end acting on said caliper arm to exert a return force thereon, retention means for frictionally retaining said spring in a stationary position relative to said pivot post while enabling purposeful adjustment of that position at all times and at all times enabling relative rotary movement of said bushing relative to said spring, a brake shoe holder with a brake shoe therein, mounted on the shoe-attachment end of said caliper arm, a roller-mounting post secured to the cam-facing end of each said caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to said cam rollers, and a brake-actuating cable secured to said cam plate along the central axis thereof for moving said cam plate relative to said cam rollers and thereby to spread said cam rollers apart and force said brake shoes inwardly, said brake shoe holder comprising support means, shoe retaining means, attachment means for securing said support means to said shoe-retaining means for adjustment of them lengthwise relative to each other and for rotation relative to each other, positioning means for securing said support means to said caliper arm for adjustment lengthwise of the support means on said caliper arm and for adjustment rotationally of the support means relative to the lengthwise centerline of said caliper arm, and clamping means for releasably clamping said support means rigidly to said caliper arm when adjustment has been made, said caliper arm including a cylindrical stem, said positioning means comprises a clamp member with an end portion having a threaded opening therethrough and a pair of looped arms extending out from the upper end of the end portion and, via an arcuate, generally semicircular opposite-end portion, back to the said end portion, a clamp block having an end wall facing the end portion of the clamp member, an arcuate portion at the other end from said end wall, a through opening in between the end wall and the arcuate portion and perpendicular to the planes of said arms and in between them, and a slot extend into said through opening, and a said screw engaging said threaded opening and facing and engaging said end wall, said support means including a cylindrical rod portion extending into and through said through opening, whereby said support means, and therefore said shoe retaining means, is adjustable longitudinally and rotationally relative to said clamp block and said clamp block and clamp member combination is adjustable rotationally and longitudinally relative to said stem.

14. A caliper brake for wide-tire bicycles having a frame and wheels with a narrow rim and a tire wide relative to the rim, including in combination a pair of stationary pivot posts rigidly, permanently, and immovably secured directly to said frame, one on each of the opposite sides of the tire and rim, a caliper arm for each said pivot post having an intermediate pivot portion rotatably mounted on said pivot post, said caliper arms each having fore and aft faces, one face being substantially flat and the other face tapered from a thick portion at and near said pivot portion to a thin portion at said cam-facing end, so that the two caliper arms can be exchanged and inverted to provide different operating conditions, a separate return spring for each pivot post, each having one end adjustably secured relative to said pivot post and a second end acting on said caliper arm to exert a return force thereon, retention means for frictionally retaining said spring in a stationary position relative to said pivot post while enabling purposeful adjustment of that position at all times and at all times enabling relative rotary movement of said spring relative to said pivot post, a brake shoe holder with a brake shoe therein, mounted on the shoe-attachment end of said caliper arm, a roller-mounting post secured to the cam-facing end of each said caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to said cam rollers, and a brake-actuating cable secured to said cam plate along the central axis thereof for moving said cam plate relative to said cam rollers and thereby to spread said cam rollers apart and force said brake shoes inwardly, said bushing enabling alignment of said caliper arm thereon with said cable.

15. A caliper brake for wide-tire mountain bicycles having a bifurcated frame and wide tires mounted on narrow rims, including in combination a pair of stationary pivot posts rigidly and permanently secured to said frame, one on each of the opposite sides of the tire and tire rim, each said pivot post having an inner shoulder near said frame, an outer shoulder, and an outboard end, a cylindrical bushing rotatably mounted on each said pivot post in between said shoulders and shorter than the distances between them, a caliper arm thinner than the length of said bushing and having an intermediate pivot opening press-fitted to each said bushing , a shoe-attachment end, and a cam-facing end, a spring support member around each said pivot post and abutting said outer shoulder and having a keyed polygonal head, a linear wire return spring having one end secured to said spring support member and extending out toward said cam-facing end of said caliper arm, clamping means for clamping said spring support member against said outer shoulder for clearance between it and said bushing sufficiently to retain the spring support member by friction in a stationary position relative to said post while enabling purposeful adjustment of that position without interfering with rotary movement of said bushing relative to said spring support member, a brake shoe holder with a brake shoe therein, mounted on the shoe-attachment end of said caliper arm, a roller-mounting post secured to the cam-facing end of each caliper arm and in engagement with the outboard end of said wire spring at a locus where it urges that roller-mounting post toward the one on the other caliper arm, a cam roller mounted rotatably on each said roller mounting post between said spring and said caliper arm, each said roller having a circumferential groove therein, a cam plate having two opposite cammed edges and mounted with the cammed edges in engagement with said grooves in said rollers, and a brake-actuating cable secured to said cam plate along the central axis thereof, whereby said return springs can be individually adjusted to vary the force urging the roller mounting posts toward each other and the shoe holders apart from each other by varying the rotational position of said spring support member relative to said pivot post, and whereby the relative position of each bushing and its caliper arm, when press-fitted together, serves to align the cam roller grove, cam plate, and cable properly.

16. The brake of claim 15 wherein said cable is secured to said cam plate by a clamp plate having a cable-receiving groove on a face facing said cam plate and means for clamping said cam plate and said clamp plate together with said cable in between them in said groove.

17. The brake of claim 15 wherein
said caliper arm includes a cylindrical stem, and
said shoe holder includes
a ring around said stem for adjustment thereon lengthwise and rotationally,
clamping means for releasably clamping said ring rigidly to said caliper arm stem when adjustment has been made,
a shoe retainer for said shoe,
a threaded stud rigidly attached to said shoe retainer and threaded into said ring for adjustment lengthwise relative to said ring and also for adjustment of their relative rotational position, and
a lock nut for locking said threaded stud in position relative to said ring.

18. The brake of claim 17 wherein said brake is asymmetrically mounted so that it extends further on the side away from the frame than on the other side and is never in any plane extending perpendicularly through both parts of the frame that lie on opposite sides of said tire.

19. The brake of claim 17 wherein said caliper arms each have fore and aft faces, one being substantially flat and the other tapered from a thick portion at and near said pivot portion to a thin portion at said camfacing end, so that the two caliper arms can be exchanged and inverted to provide different operating conditions.

20. The brake of claim 17 wherein said cam plate edges are shaped to provide a pair of depressions in which said rollers normally rest when the brake is not engaged, a brake actuation ramp for non-linear accelerating engagement of the brake, and a safety stop to prevent accidental disengagement of the rollers and edges at the extremity of the brake stroke.

21. A caliper brake for wide-tire bicycles having a frame with two portions, one on each side of a wheel having a tire and a tire rim, including in combination
a pair of stationary pivot posts rigidly secured to said frame, one on each of the opposite sides of the tire and tire rim,
a caliper arm pivoted at an intermediate point to each said pivot post, said caliper arm having a shoe-attachment end with a cylindrical stem, and a cam-facing end, said caliper arms each having fore and aft faces, one being substantially flat and the other tapered from a thick portion at and near said pivot portion to a thin portion at said cam-facing end, so that the two caliper arms can be exchanged and inverted to provide different operating conditions,
return spring means at each said pivot post for urging said shoe attachment ends apart from each other, and
a brake shoe holder connected to said shoe-attachment end and holding a brake shoe,
said shoe holder being asymmetrically secured to said arm so that the shoe extends further on one side of said arm than on the other side, so that said shoe is spaced away from said post and on the side of said post toward which the wheel and rim rotate forwardly, thereby enabling quick release of the wheel.

22. A caliper brake for wide-tire bicycles having a frame, including in combination
a pair of stationary pivot posts rigidly secured to said frame, one on each of the opposite sides of the tire and tire rim,
a caliper arm pivoted at an intermediate point to each said pivot post, said caliper arm having a shoe-attachment end, and a cam-facing end, said caliper arms each having fore and aft faces, one being substantially flat and the other tapered from a thick portion at and near said pivot portion to a thin portion at said cam-facing end, so that the two caliper arms can be exchanged and inverted to provide different operating conditions,
return spring means for normally urging said cam facing ends toward each other and said shoe attachment ends away from each other,
a brake shoe holder with a brake shoe therein, mounted on the shoe-attachment end of said caliper arm,
a roller-mounting post secured to the cam-facing end of each caliper arm and in engagement with the outboard end of said wire spring,
low-friction bearing means mounted on said roller-mounting post,
a cam roller mounted rotatably on each said bearing means having a circumferential groove therein,
a cam plate having two opposite cammed edges in engagement with said grooves in said rollers, said cammed edges being shaped to increase the mechanical advantage thereof as the braking force of the bicycle rider increases, and
a brake-actuating cable secured to said cam plate along the central axis thereof.

23. A caliper brake for wide-tire bicycles having a frame, including in combination
- a pair of stationary pivot posts rigidly secured to said frame, one on each of the opposite sides of the tire and tire rim,
- a caliper arm pivoted at an intermediate point to each said pivot post, said caliper arm having a shoe-attachment end, and a cam-facing end,
- return spring means for normally urging said cam facing ends toward each other and said shoe attachment ends away from each other,
- a brake shoe holder with a brake shoe therein, mounted on the shoe-attachment end of said caliper arm,
- a roller-mounting post secured to the cam-facing end of each caliper arm and in engagement with the outboard end of said wire spring,
- a ballbearing sealed against the entry of mud and water, mounted on said roller-mounting post,
- a cam roller mounted rotatably on each said sealed ball bearing having a circumferential groove therein,
- a cam plate having two opposite cammed edges in engagement with said grooves in said rollers, said cammed edges being shaped to increase the mechanical advantage thereof as the braking force of the bicycle rider increases, and
- a brake-actuating cable secured to said cam plate along the central axis thereof, whereby said sealed ball bearing is unaffected by said roller and said roller mounting post passing through mud or water and by the dried residue from mud and muddy water and wet-dry cycles,
- said cam plate edges being shaped to provide
- a pair of depressions at the end of said cam plate nearer said cable, in which said rollers normally rest when the brake is not engaged and which act upon the release of said brake to accelerate retraction of said shoe from said rim,
- a brake actuation ramp for non-linear accelerating engagement of the brake, providing means causing the brake caliper arms to move quickly from said depressions so that said shoes move up to said rim, and, when said shoe is in contact with said rim, to move more slowly but with greater mechanical advantage as the shoe is clamped more tightly on said rim and causing said brake to act oppositely therefrom when said brake is released, and
- a safety stop at the end of said cam plate further from said cable to prevent accidental disengagement of the rollers and edges at the extremity of the brake stroke.

24. A wide-tire mountain-type bicycle, including in combination:
- a frame having a head tube, a down tube, a seat tube, a pair of seat stays, and a pair of chain stays having upper and lower surfaces, and also having a fork rotatably mounted in said head tube, said fork having a pair of blades with forward facing surfaces, and a handlebar on the upper end of said fork,
- a front wheel and a rear wheel, each with a rim and a wide tire,
- two pairs of stationary pivot posts rigidly, permanently, and immovably secured to said frame, one on each of the opposite sides of each tire and tire rim, one pair mounted to the forward-facing surfaces of said fork blades and one pair mounted on one said pair of stays, each said post having a pair of stops, one inboard near said blades or stays and one outboard from which projects a reduced-diameter threaded outboard end,
- a cylindrical bushing rotatably mounted on each said post inboard of said threaded outboard end, between said shoulders and shorter than the distance between said shoulders,
- a caliper arm thinner than said bushing is long, having an intermediate pivot opening press-fitted to and coaxial with each said bushing so that said arm and its said bushing can be adjusted axially relative to each other, a shoe-attachment end, and a cam-facing end,
- each said caliper arm being press-fitted to its said bushing, to enable adjustment relative to the axis of said bushing at a time of alignment while otherwise said bushing is firmly retained in relation to said caliper arm and enabling low-friction rotation of said bushing with said caliper arm relative to said pivot post,
- a separate return spring for each pivot post, each having one end adjustably secured relative to said pivot post and a second end acting on said caliper arm,
- polygonal keyed retention means mounted on said pivot post for frictonally retaining any desired position of said return spring to which it is set and for enabling purposeful resetting of said return spring, and at all times enabling relative rotary movement of said bushing relative to said return spring,
- a brake shoe holder with a brake shoe therein, mounted on the shoe-attachment end of each said caliper arm,
- a roller-mounting post secured to the cam-facing end of each caliper arm,
- a cam roller mounted rotatably on each said roller mounting post between said spring and said caliper arm, each said roller having a circumferential groove therein,
- a pair of cam plates, one for each wheel, having two opposite cammed edges and mounted with the cammed edges in engagement with said grooves in said rollers, said cammed edges causing substantial increases in mechanical advantage and braking force as said cam plate is moved to actuate the brake,
- a brake-actuating cable secured to each said cam plate along the central axis thereof, and
- a brake lever for each said brake mounted on the handlebar, one connected to each said cable at the end opposite from said cam plate,
- whereby said return springs can be individually adjusted to govern the effect on their respective brake shoes by varying their rotational position relative to said pivot post and they also act on each other through said cam plate,
- said bushing enabling alignment of said caliper arm thereon with said cable, said bushing being longer than said caliper arm is thick so that the axial adjustment of said caliper arm relative to said bushing at the time of press fitting can provide proper alignment of said cable and cam plate with the groove of said cam roller.

25. The wide-tire bicycle of claim 24 wherein
- each said return spring is a spring with its active part, the part which flexes during its use cycle, substantially linear and straight when in its relaxed state, an outboard end engaging said roller-mounting post, tending to urge that roller mounting post toward the one on the other caliper arm, and each said retention means comprises a polygonal keyed member to which said spring is secured and frictional means for holding said keyed member stationary relative to said pivot post with an especially strong spring force due to the linear structure, while enabling purposeful rotation thereof by a key-engaging tool for adjusting spring tension on said roller-mounting post by adjusting the rotational position of said keyed member relative to said pivot post.

26. The wide-tire bicycle of claim 24 wherein said shoe is asymmetrically secured to said arm, so that the shoe extends mostly on one side of the arm than on the other side and away from said frame on the side toward which its said wheel and rim move, said shoes and shoe-retainers being thereby spaced so that they can be spread apart without touching said frame in order to facilitate removal of the wheel with its narrow rim and wide tire.

27. A wide-tire mountain-type bicycle, including in combination:
  a frame having a head tube, a down tube, a seat tube, a pair of seat stays, and a pair of chain stays having upper and lower surfaces, and also having a fork rotatably mounted in said head tube, said fork having a pair of blades with forward facing surfaces, and a handlebar on the upper end of said fork,
  a front wheel and a rear wheel, each with a rim and a wide tire,
  two pairs of stationary pivot posts rigidly, permanently, and immovably secured to said frame, one on each of the opposite sides of each tire and tire rim, one pair mounted to the forward-facing surfaces of said fork blades and one pair mounted on one said pair of stays, each said post having a pair of stops, one inboard near said blades or stays and one outboard from which projects a reduced-diameter threaded outboard end,
  each said pivot post being brazed to said frame to secure complete rigidity therewith and each said caliper arm being press-fitted to its said bushing, said bushing being longer than said caliper arm is thick to enable position adjustment during press fitting that ensures proper alignment of said cable, cam plate, and the grove of said cam roller,
  a cylindrical bushing rotatably mounted on each said post inboard of said threaded outboard end, between said shoulders and shorter than the distance between said shoulders,
  a caliper arm thinner than said bushing is long, having an intermediate pivot opening press-fitted to and coaxial with each said bushing so that said arm and its said bushing can be adjusted axially relative to each other, a shoe-attachment end, and a cam-facing end,
  a separate return spring for each pivot post, each having one end adjustably secured relative to said pivot post and a second end acting on said caliper arm,
  polygonal keyed retention means mounted on said pivot post for frictionally retaining any desired position of said return spring to which it is set and for enabling purposeful resetting of said return spring at any time by a polygonal wrench without disassembly or loosening and at all times enabling relative rotary movement of said bushing relative to said return spring,
  a brake shoe holder with a brake shoe therein, mounted on the shoe-attachment end of each said caliper arm,
  a roller-mounting post secured to the cam-facing end of each caliper arm,
  a cam roller mounted rotatably on each said roller mounting post between said spring and said caliper arm, each said roller having a circumferential groove therein,
  a pair of cam plates, one for each wheel, having two opposite cammed edges and mounted with the cammed edges in engagement with said grooves in said rollers, said cammed edges causing substantial increases in mechanical advantage and braking force as said cam plate is moved to actuate the brake,
  a brake-actuating cable secured to each said cam plate along the central axis thereof, and
  a brake lever for each said brake mounted on the handlebar, one connected to each said cable at the end opposite from said cam plate,
  whereby said return springs can be individually adjusted to govern the effect of their respective brake shoes by varying their rotational position relative to said pivot post and they also act on each other through said cam plate.

28. A wide-tire mountain-type bicycle, including in combination:
  a frame having a head tube, a down tube, a seat tube, a pair of seat stays, and a pair of chain stays having upper and lower sufaces, the brake for the rear wheel being mounted on the lower surface of and lying below said chain stays and also having a fork rotatably mounted in said head tube, said fork having a pair of blades with forwarding facing surfaces, and a handlebar on the upper end of said fork,
  a front wheel and a rear wheel, each with a rim and a wide tire,
  two pairs of stationary pivot posts rigidly, permanently, and immovably secured to said frame, one on each of the opposite sides of each tire and tire rim, one pair mounted to the forward-facing surfaces of said fork blades and one pair mounted on one said pair of stays, each said post having a pair of stops, one inboard near said blades or stays and one outboard from which projects a reduced-diameter threaded outboard end,
  a cyclindrical bushing rotatably mounted on each said post inboard of said threaded outboard end, between said shoulders and shorter than the distance between said shoulders,
  a caliper arm thinner than said bushing is long, having an intermediate pivot opening press-fitted to and coaxial with each said bushing so that said arm and its said bushing can be adjusted axially relative to each other, a shoe-attachment end, and a cam-facing end,
  a separate return spring for each pivot post, each having one end adjustably secured relative to said pivot post and a second end acting on said caliper arm,
  polygonal keyed retention means mounted on said pivot post for frictionally retaining any desired position of said return spring to which it is set and for enabling purposeful resetting of said return spring at any time and at all times enabling relative rotary movement of said bushing relative to said return spring, a brake shoe holder with a brake shoe therein, mounted on the shoe-attachment end of each said caliper arm, a roller-mounting post secured to the cam-facing end of each caliper arm, a cam roller mounted rotatably on each said roller mounting post between said spring and said caliper arm, each said roller having a circumferential groove therein, a pair of cam plates, one for each wheel, having two opposite cammed edges and mounted with the cammed edges in engagement with said grooves in said rollers, said cammed edges causing substantial increases in mechanical advantage and braking force as said cam plate is moved to actuate the brake, a brake-actuating cable secured to each said cam plate along the central axis thereof, and a brake lever for each said brake mounted on the handlebar, one connected to each said cable at the end opposite from said cam plate, whereby said return springs can be individually adjusted to govern the effect on their respective brake shoes by varying their rotational position relative to said pivot post and they also act on each other through said cam plate.

29. A wide-tire mountain-type bicycle, including in combination:

a frame having a head tube, a down tube, a seat tube, a pair of seat stays, and a pair of chain stays having upper and lower surfaces, and also having a fork rotatably mounted in said head tube, said fork having a pair of blades with forward facing surfaces, and a handlebar on the upper end of said fork, a front wheel and a rear wheel, each with a rim and a wide tire, two pairs of stationary pivot posts rigidly and permanently secured to said frame, one on each of the opposite sides of each tire and tire rim, one pair mounted to the forward-facing surfaces of said fork blades and one pair mounted on opposite said stays, each said post having a pair of stops, one inboard near said blades or stays and one outboard from which springs a reduced-diameter threaded outboard end, a cyclindrical bushing rotatably mounted on each said post inboard of said threaded outboard end, between said shoulders and shorter than the distance between said shoulders, a caliper arm thinner than said bushing is long, having an intermediate pivot opening press-fitted to each said bushing, a shoe-attachment end, and a cam-facing end, a return spring for each pivot post having one end adjustably secured relative to said pivot post and a second end acting on said caliper arm, retention means mounted on said pivot post for frictionally retaining any desired position of said return spring to which it is set and for enabling purposeful resetting of said return spring at any time, and at all times enabling relative rotary movement of said bushing relative to said return spring, a brake shoe holder with a brake shoe therein, mounted on the shoe-attachment end of each said caliper arm, a roller-mounting post secured to the cam-facing end of each caliper arm, a cam roller mounted rotatably on each said roller mounting post between said spring and said caliper arm, each said roller having a circumferential groove therein, a pair of cam plates, one for each wheel, having two opposite cammed edges and mounted with the cammed edges in engagement with said grooves in said rollers, said cammed edges causing substantial increases in mechanical advantage and braking force as said cam plate is moved to actuate the brake, a brake-actuating cable secured to each said cam plate along the central axis thereof, and a brake lever for each said brake mounted on the handlebar, one connected to each said cable at the end opposite from said cam plate, whereby said return springs can be individually adjusted to govern the effect on their respective brake shoes by varying their rotational position relative to said pivot post and they also act on each other through said cam plate, said brake shoe holder comprising support means, shoe retaining means, attachment means for securing said support means to said shoe-retaining means for adjustment of them lengthwise relative to each other and for rotation relative to each other, positioning means for securing said support means to said caliper arm for adjustment lengthwise of the support means on said caliper arm and for adjustment rotationally of the support means relative to the lengthwise centerline of said caliper arm, and clamping means for releasably clamping said support means rigidly to said caliper arm when adjustment has been made, said caliper arm including a cylindrical stem, said positioning means comprising a clamp member with an end portion having a threaded opening therethrough and a pair of looped arms extending out from the upper end of the end portion and, via an arcuate, generally semicircular opposite end portion, back to the said end portion, a clamp block having an end wall facing the end portion of the clamp member, an arcuate portion at the other end for said end wall, a through opening in between the end wall and the arcuate portion and perpendicular to the planes of said arms and in between them, and a slot extending into said through opening, and a said screw engaging said threaded opening and facing and engaging said end wall, said support means including a cylindrical rod portion extending into and through said through opening, whereby said support means, and therefore said shoe retaining means, is adjustable longitudinally and rotationally relative to said clamp block and said clamp block and clamp member combination is adjustable rotationally and longitudinally relative to said stem.

30. The wide-tire bicycle of claim 29 wherein said caliper arm includes a cylindrical stem, said positioning means comprising a ring portion of said support means to which is attached said clamping means, said support means including a socket rigidly attached to said ring and threaded to a stud extending from said shoe retaining means, said attachment means including a lock nut for locking said threaded stud relative to said ring.

31. A wide-tire mountain-type bicycle, including in combination:

a frame having a head tube, a down tube, a seat tube, a pair of seat stays, and a pair of chain stays having upper and lower surfaces, and also having a fork rotatably mounted in said head tube, said fork having a pair of blades with forward facing surfaces, and a handlebar on the upper end of said fork, a front wheel and a rear wheel, each with a rim and a wide tire, two pairs of stationary pivot posts rigidly and permanently secured to said frame, one on each of the opposite sides of each tire and tire rim, one pair mounted to the forward-facing surfaces of said fork blades and one pair mounted on opposite sides of said stays, each said post having a pair of stops, one inboard near said blades or stays and one outboard from which springs a reduced-diameter threaded outboard end, a cylindrical bushing rotatably mounted on each said post inboard of said threaded outboard end, between said shoulders and shorter than the distance between said shoulders, a caliper arm thinner than said bushing is long, having an intermediate pivot opening press-fitted to each said bushing, a shoe-attachment end, and a cam-facing end, a return spring for each pivot post having one end adjustably secured relative to said pivot post and a second end acting on said caliper arm.

retention means mounted on said pivot post for frictionally retaining any desired position of said return spring to which it is set and for enabling purposeful resetting of said return spring at any time, and at all times enabling relative rotary movement of said bushing relative to said return spring, a brake shoe holder with a brake shoe therein, mounted on the shoe-attachment end of each said caliper arm, a roller-mounting post secured to the cam-facing end of each caliper arm, a cam roller mounted rotatably on each said roller mounting post between said spring and said caliper arm, each said roller having a circumferential groove therein, a pair of cam plates, one for each wheel, having two opposite cammed edges and mounted with the cammed edges in engagement with said grooves in said rollers, said cammed edges causing substantial increases in mechanical advantage and braking force as said cam plate is moved to actuate the brake, said cam plate for the rear wheel brake having its cammed edges steeper than those of the cam plate for the front wheel brake, to impart stronger braking response for the rear wheel brake than for the front wheel brake a brake-actuating cable secured to each said cam plate along the central axis thereof, and a brake lever for each said brake mounted on the handlebar, one connected to each said cable at the end opposite from said cam plate, whereby said return springs can be individually adjusted to govern the effect on their respective brake shoes by varying their rotational position relative to said pivot post and they also act on each other through said cam plate.

32. A retrofit kit for applying replacement brakes to a mountain-type wide-tire bicycle having a frame with a rear brake cable and a front brake cable, said kit comprising four stationary pivot posts to be rigidly and immovably secured directly to said frame, one on each of the opposite sides of each tire and tire rim, four caliper arms, each having an intermediate pivot portion for attachment to each said pivot post and each having a shoe-attachment end, and a cam-facing end, four identical return springs each having one end that is to be adjustably secured relative to said pivot post and a second end for acting on said caliper arm, polygonal keyed retention means for each said return spring for retaining said spring member in a stationary position relative to said pivot post while enabling purposeful adjustment of that position at all times while said retention means is fully tight and also at all times enabling relative rotary movement of said spring relative to said pivot post, four identical brake shoe holders, each with a brake shoe therein, mounted on the shoe-attachment end of said caliper arm, four identical roller-mounting posts, each secured to the cam-facing end of a said caliper arm, a cam roller mounted rotatably on each said roller mounting post and having a circumferential groove therein, and two cam plates, each with means for securement along its central axis to one said brake cable, each having two opposite cammed edges in engagement with said grooves in two said rollers, said cammed edges causing a substantial increase in mechanical advantage the further the cam is moved during brake actuation.

33. The kit of claim 32 wherein each said return spring is a spring with its active part, the part which flaxes during its use cycle being substantially linear and straight when in its relaxed state, an outboard end of said spring engaging said roller-mounting post, tending to urge that roller mounting post toward the one on the other caliper arm of a pair, and said retention means comprises a polygonal keyed member to which said spring is secured and frictional means for holding said keyed member stationary relative to said pivot post with an especially strong spring force due to the linear structure, while enabling purposeful rotation thereof by a key-engaging tool for adjusting spring tension on said roller-mounting post by adjusting the rotational position of said keyed member relative to said pivot post.

34. A retrofit kit for applying replacement brakes to a mountain-type wide-tire bicycle having a frame with a rear brake cable and a front brake cable, said kit comprising four stationary pivot posts to be rigidly secured directly to said frame, one on each of the opposite sides of each tire and tire rim, four identical cylindrical bushings for rotatable mounting on each said pivot post, four caliper arms, each having an intermediate pivot portion for affixation to each said bushing by press fitting and each having a shoe-attachment end, and a cam-facing end, four identical return springs each having one end that is to be adjustably secured relative to said pivot post and a second end for acting on said caliper arm, retention means for each said return spring for retaining said spring member in a stationary position relative to said pivot post while enabling purposeful adjustment of that position at all times and also at all times enabling relative rotary movement of said bushing relative to said spring, four identical brake shoe holders, each with a brake shoe therein, mounted on the shoe-attachment end of said caliper arm, four identical roller-mounting posts, each secured to the cam-facing end of a said caliper arm, a cam roller mounted rotatably on each said roller mounting post and having a circumferential groove therein, and two cam plates, each with means for securement along its central axis to one said brake cable, each having two opposite cammed edges in engagement with said grooves in two said rollers, said cammed edges causing a substantial increase in mechanical advantage the further the cam is moved during brake actuation, the two cam plates being different from each other, one, for use on a rear brake, having a steeper cammed edge than the other, for use on a front brake.

35. A retrofit kit for applying replacement brakes to a mountain-type wide-tire bicycle having a frame with a rear brake cable and a front brake cable, said kit comprising four stationary pivot posts to be rigidly and immovably secured directly to said frame, one on each of the opposite sides of each tire and tire rim, four caliper arms, each having an intermediate pivot portion for attachment to a said pivot post and each having a shoe-attachment end, and a cam-facing end, said caliper arms each having fore and aft faces, one being substantially flat and the other tapered from a thick portion at and near said pivot portion to a thin portion at said cam-facing end, so that the two caliper arms can be exchanged and inverted to provide different operating conditions, four identical return springs each having one end that is to be adjustably secured relative to said pivot post and a second end for acting on said caliper arm, polygonal keyed retention means for each said return spring for retaining said spring member in a stationary position relative to said pivot post while enabling purposeful adjustment of that position at all times and also at all times enabling relative rotary movement of said spring relative to said pivot post four identical brake shoe holders, each with a brake shoe therein, mounted on the shoe-attachment end of said caliper arm, four identical roller-mounting posts, each secured to the cam-facing end of a said caliper arm, a cam roller mounted rotatably on each said roller mounting post and having a circumferential groove therein, and two cam plates, each with means for securement along its central axis to one said brake cable, each having two opposite cammed edges in engagement with said grooves in two said rollers, said cammed edges causing a substantial increase in mechanical advantage the further the cam is moved during brake actuation.

36. A retrofit kit for applying replacement brakes to a mountain-type wide-tire bicycle having a frame with a rear brake cable and a front brake cable, said kit comprising four stationary pivot posts to be rigidly secured directly to said frame, one on each of the opposite sides of each tire and tire rim, four identical cylindrical bushings for rotatable mounting on each said pivot post, four caliper arms, each having an intermediate pivot portion for affixation to each said bushing by press fitting and each having a shoe-attachment end having a cylindrical stem, and a cam-facing end, four identical return springs each having one end that is to be adjustably secured relative to said pivot post and a second end for acting on said caliper arm, retention means for each said return spring for retaining said spring member in a stationary position relative to said pivot post while enabling purposeful adjustment of that position at all times and also at all times enabling relative rotary movement of said bushing relative to said spring, four identical brake shoe holders, each with a brake shoe therein, mounted on the shoe-attachment end of said caliper arm, four identical roller-mounting posts, each secured to the cam-facing end of said caliper arm, a cam roller mounted rotatably on each said roller mounting post and having a circumferential groove therein, two cam plates, each with means for securement along its central axis to one said brake cable, each having two opposite cammed edges in engagement with said grooves in two said rollers, said cammed edges causing a substantial increase in mechanical advantage the further the cam is moved during brake actuation, each said brake shoe holder comprising, support means, shoe retaining means, attachment means for securing said support means to said shoe-retaining means for adjustment of them lengthwise relative to each other and for rotation relative to each other, positioning means for securing said support means to said caliper arm for adjustment lengthwise of the support means on said caliper arm and for adjustment rotationally of the support means relative to the lengthwise centerline of said caliper arm, and clamping means for releasably clamping said support means rigidly to said caliper arm when adjustment has been made, said positioning means comprising a clamp member with an end portion having a threaded opening therethrough and a pair of looped arms extending out from the upper end of the end portion and, via an arcuate, generally semicircular opposite end portion, back to the said end portion, a clamp block having an end wall facing the end portion of the clamp member, an arcuate portion at the other end for said end wall, a through opening is between the end wall and the arcuate portion and perpendicular to the planes of said arms and in between them, and a slot extend into said through opening, and a said screw engaging said threaded opening and facing and engaging said end wall, said support means including a cylindrical rod portion extending into and through said through opening, whereby said support means, and therefore said shoe retaining means, is adjustable longitudinally and rotationally relative to said clamp block and said clamp block and clamp member combination is adjustable rotationally and longitudinally relative to said stem.

37. The kit of claim 36 wherein said shoe retaining means is asymmetrically secured to said support means, in a way such that the shoe retaining means extends further on the side of the support means distant from said frame than on the other side closer to said frame, so that upon release of said cam from said rollers said shoes can be spaced apart from each other without interference from said tire.

38. In a caliper brake for wide-tire bicycles having a frame and wheels with a narrow rim and a wide tire and having a pair of caliper arms pivoted at an intermediate pivot portion and having a shoe-attachment end on one extremity, and brake actuating means at its other extremity the combination therewith of:

a brake shoe holder with a brake shoe therein, mounted on the shoe-attachment end of said caliper arm, said brake shoe holder comprising support means, shoe retaining means, attachment means for securing said support means to said shoe-retaining means for adjustment of them lengthwise relative to each other and for rotation relative to each other, positioning means for securing said support means to said caliper arm for adjustment lengthwise of the support means on said caliper arm and for adjustment rotationally of the support means relative to the lengthwise centerline of said caliper arm, and clamping means for releasably clamping said support means rigidly to said caliper arm when adjustment has been made, said caliper arm including a cylindrical stem, said positioning means comprises a clamp member with an end portion having a threaded opening therethrough and a pair of looped arms extending out from the upper end of the end portion and, via an arcuate, generally semicircular opposite-end portion, back to the said end portion, a clamp block having an end wall facing the end portion of the clamp member, an arcuate portion at the other end from said end wall, a through opening in between the end wall and the arcuate portion and perpendicular to the planes of said arms and in between them, and a said screw engaging said threaded opening and facing and engaging said end wall, said support means including a cylindrical rod portion extending into and through said through opening, whereby said support means, and therefore said shoe retaining means, is adjustable longitudinally and rotationally relative to said clamp block and said clamp block and clamp member combination is adjustable rotationally and longitudinally relative to said stem.

39. A brake shoe holder to be mounted on a caliper arm including a cylindrical stem, including in combination:

positioning means comprising a clamp member with an end portion having a threaded opening therethrough and a pair of looped arms extending out from the upper end of the end portion and, via an arcuate, generally semicircular opposite end portion, back to the said end portion, a clamp block having an end wall facing the end portion of the clamp member, an arcuate portion at the other end of said end wall, a through opening in between the end wall and the arcuate portion and perpendicular to the planes of said arms and in between them, and a slot extend into said through opening, and a said screw engaging said threaded opening and facing and engaging said end wall, support means including a cylindrical rod portion extending into and through said through opening, whereby said support means, is adjustable longitudinally and rotationally relative to said clamp block and said clamp block and clamp member combination is adjustable rotationally and longitudinally relative to said stem.

40. A caliper brake for bicycles having a frame and wheels with a rim and a tire, including in combination a pair of stationary pivot posts rigidly, permanently, and immovably secured directly to said frame, one on each of the opposite sides of the tire and rim, a caliper arm mounted on each said pivot post and having an intermediate pivot portion, a shoe-attachment end on one extremity, and a cam-facing end at its other extremity, a return spring for each pivot post having one end adjustably secured relative to said pivot post and a second end acting on said caliper arm to exert a return force thereon, a polygonal keyed member secured to said spring for frictionally retaining said spring in a stationary position relative to said pivot post while enabling purposeful adjustment of that position while said retention means is kept fully tightened, enabling purposeful relative rotary movement of said spring relative to said pivot post, a brake shoe holder with a brake shoe therein, mounted on the shoe-attachment end of said caliper arm, a roller-mounting post secured to the cam-facing end of each said caliper arm, a cam roller mounted rotatably on each said roller mounting post and having a circumferential groove therein, a cam plate having two opposite cammed edges in engagement with said grooves in said rollers, and a brake-actuating cable secured to said cam plate along the central axis thereof for moving said cam plate relative to said cam rollers and thereby to spread said cam rollers apart and force said brake shoes inwardly.

41. The brake of claim 40 wherein each said return spring is a spring with its active part, the part which flexes during its use cycle, being substantially linear and straight when in its relaxed state and an outboard end engaging and pushing on said roller-mounting post with an especially strong spring force, due to the linear structure, and tending to urge that roller mounting post toward the one on the other caliper arm, and said retention means comprises a polygonal keyed member to which said spring is secured, and frictional means for holding said keyed member stationary relative to said pivot post, while enabling purposeful rotation thereof by a standard wrench, for adjusting the spring tension on said roller-mounting post by adjusting the rotational position of said keyed member relative to said pivot post.

42. A caliper brake for bicycles having a frame and wheels with a rim and a tire, including in combination a pair of stationary pivot posts rigidly, permanently, and immovably secured directly to said frame, one on each of the opposite sides of the tire and rim, a cylindrical bushing for each said pivot post for relative rotation of said bushing about said pivot post, a caliper arm having an intermediate pivot portion separate from but snugly affixed to each said bushing, a shoe-attachment end on one extremity, and a cam-facing end at its other extremity, a return spring for each pivot post having one end adjustably secured relative to said pivot post and a second end acting on said caliper arm to exert a return force thereon, a polygonal keyed member secured to said spring for frictionally retaining said spring in a stationary position relative to said pivot post while enabling purposeful adjustment and enabling purposeful relative rotary movement of said bushing relative to said spring by application of a simple wrench to said keyed member, a brake shoe holder with a brake shoe therein, mounted on the shoe-attachment end of said caliper arm, a roller-mounting post secured to the cam-facing end of each said caliper arm, a cam roller mounted rotatably on each said roller mounting post and having a circumferential groove therein, a cam plate having two opposite cammed edges in engagement with said grooves in said rollers, said cammed edges being shaped to cause substantial increases in force the further said cam plate is moved during brake application relative to aid cam rollers, and a brake-actuating cable secured to said cam plate along the central axis thereof for moving said cam plate relative to said cam rollers and thereby to spread said cam rollers apart and force said brake shoes inwardly, said bushing being longer than said caliper arm is thick, so that adjustments along their relative axial positions can result in obtaining accurate alignment of said cable and said cam plate relative to the groove of said cam roller, said caliper arm and bushing being held together by a press fit, for enabling said adjustments of their relative axial position at the time of initial installation with retention of said relative positions thereafter.

43. A caliper brake for wide-tire mountain bicycles having a bifurcated frame and wide tires mounted on narrow rims, including in combination a pair of stationary pivot posts rigidly, immovably and permanently secured to said frame, one on each of the opposite sides of the tire and tire rim, each said pivot post having an inner shoulder near said frame and an outboard end, a cylindrical bushing rotatably mounted on each said pivot post in between said shoulder and said outboard end and shorter than the distances between them, a caliper arm thinner than the length of said bushing and having an intermediate pivot opening press-fitted to each said bushing, a shoe-attachment end, and a cam-facing end, a spring support member around each said pivot post and abutting said post and having a keyed polygonal head, a wire return spring having one end secured to said spring support member and exerting pressure on said caliper arm, clamping means for clamping said spring support member against said outboard end for clearance between it and said bushing sufficiently to retain the spring support member by friction in a stationary position relative to said post while enabling purposeful adjustment of that position without interfering with rotary movement of said bushing relative to said spring support member, a brake shoe holder with a brake shoe therein, mounted on the shoe-attachment end of said caliper arm, a roller-mounting post secured to the cam-facing end of each caliper arm, a cam roller mounted rotatably on each said roller mounting post, each said roller having a circumferential groove therein, a cam plate having two opposite cammed edges and mounted with the cammed edges in engagement with said grooves in said rollers, and a brake-actuating cable secured to said cam plate along the central axis thereof, whereby said return springs can be individually adjusted to vary the force urging the roller mounting posts toward each other and the shoe holders apart from each other by varying the rotational position of said spring support member relative to said pivot post.

44. A retrofit kit for applying a replacement brake to a mountain-type wide-tire bicycle having a frame with a rear brake cable and a front brake cable, said kit comprising two stationary pivot posts to be rigidly and immovably secured directly to said frame, one on each of the opposite sides of one tire and tire rim, two caliper arms, each having an intermediate pivot portion for support by each said pivot post and each having a shoe-attachment end, and a cam-facing end, two identical return springs each having one end that is to be adjustably secured relative to said pivot post and a second end for acting on said caliper arm, polygonal keyed retention means for each said return spring for retaining said spring member in a stationary position relative to said pivot post while enabling purposeful adjustment of that position at all times while said retention means is fully tight and also at all times enabling relative rotary movement of said spring relative to said pivot post, two identical brake shoe holders, each with a brake shoe therein, mounted on the shoe-attachment end of said caliper arm,
two identical roller-mounting posts, each secured to the cam-facing end of a said caliper arm,
a cam roller mounted rotatably on each said roller mounting post and having a circumferential groove therein, and
a cam plate, each with means for securement along its central axis to one said brake cable, having two opposite cammed edges in engagement with said grooves in two said rollers, said cammed edges causing a substantial increase in mechanical advantage the further the cam is moved during brake actuation.

* * * * *